United States Patent
Suwa et al.

(10) Patent No.: US 9,347,122 B2
(45) Date of Patent: May 24, 2016

(54) MANUFACTURING METHOD OF A HIGH-STRENGTH COLD-ROLLED STEEL SHEET HAVING EXCELLENT LOCAL DEFORMABILITY

(75) Inventors: Yoshihiro Suwa, Tokyo (JP); Kazuaki Nakano, Tokyo (JP); Kunio Hayashi, Tokyo (JP); Riki Okamoto, Tokyo (JP); Nobuhiro Fujita, Tokyo (JP); Kohichi Sano, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 420 days.

(21) Appl. No.: 14/110,891

(22) PCT Filed: Apr. 12, 2012

(86) PCT No.: PCT/JP2012/060065
§ 371 (c)(1),
(2), (4) Date: Oct. 9, 2013

(87) PCT Pub. No.: WO2012/141263
PCT Pub. Date: Oct. 18, 2012

(65) Prior Publication Data
US 2014/0030546 A1   Jan. 30, 2014

(30) Foreign Application Priority Data
Apr. 13, 2011   (JP) ................. 2011-089250

(51) Int. Cl.
*C21D 8/02* (2006.01)
*C21D 8/04* (2006.01)
(Continued)

(52) U.S. Cl.
CPC .............. *C22C 38/22* (2013.01); *B32B 15/013* (2013.01); *C21D 8/0236* (2013.01);
(Continued)

(58) Field of Classification Search
None
See application file for complete search history.

(56) References Cited

U.S. PATENT DOCUMENTS

| 2004/0244877 A1 | 12/2004 | Yokoi et al. |
| 2008/0008901 A1 | 1/2008 | Sugiura et al. |

(Continued)

FOREIGN PATENT DOCUMENTS

| CN | 1599802 A | 3/2005 |
| CN | 1989267 A | 6/2007 |

(Continued)

OTHER PUBLICATIONS

Taiwanese Office Action for Taiwanese Application No. 101113110, dated Jan. 15, 2014.

(Continued)

*Primary Examiner* — Deborah Yee
(74) *Attorney, Agent, or Firm* — Birch, Stewart, Kolasch & Birch, LLP

(57) ABSTRACT

This high-strength cold-rolled steel sheet contains, in mass %, C: 0.02% to 0.20%; Si: 0.001% to 2.5%; Mn: 0.01% to 4.0%; P: 0.001% to 0.15%; S: 0.0005% to 0.03%; Al: 0.001% to 2.0%; N: 0.0005% to 0.01%; and O: 0.0005% to 0.01%; in which Si+Al is limited to less than 1.0%, and a balance being composed of iron and inevitable impurities, in which an area ratio of bainite in a metal structure is 95% or more, at a sheet thickness center portion being a range of ⅝ to ⅜ in sheet thickness from the surface of the steel sheet, an average value of pole densities of the {100}<011> to {223}<110> orientation group is 4.0 or less, and a pole density of the {332}<113> crystal orientation is 5.0 or less, and a mean volume diameter of crystal grains in the metal structure is 7 μm or less.

7 Claims, 4 Drawing Sheets

(51) Int. Cl.
    *C22C 38/22*     (2006.01)
    *C22C 38/00*     (2006.01)
    *C22C 38/02*     (2006.01)
    *C22C 38/04*     (2006.01)
    *C22C 38/06*     (2006.01)
    *C22C 38/12*     (2006.01)
    *C22C 38/14*     (2006.01)
    *B32B 15/01*     (2006.01)
    *C22C 38/08*     (2006.01)
    *C22C 38/10*     (2006.01)
    *C22C 38/16*     (2006.01)
    *C22C 38/26*     (2006.01)
    *C22C 38/28*     (2006.01)
    *C22C 38/38*     (2006.01)
    *C21D 9/46*     (2006.01)

(52) U.S. Cl.
    CPC ........... *C21D 8/0263* (2013.01); *C21D 8/0426* (2013.01); *C21D 8/0436* (2013.01); *C21D 8/0473* (2013.01); *C21D 9/46* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/12* (2013.01); *C22C 38/14* (2013.01); *C22C 38/16* (2013.01); *C22C 38/26* (2013.01); *C22C 38/28* (2013.01); *C22C 38/38* (2013.01); *C21D 2201/05* (2013.01); *C21D 2211/002* (2013.01); *C21D 2211/008* (2013.01); *C21D 2211/009* (2013.01); *Y10T 428/12799* (2015.01)

(56) References Cited

U.S. PATENT DOCUMENTS

2013/0153091 A1* 6/2013 Fujita .................. C21D 8/0226
    148/504
2013/0323112 A1* 12/2013 Okamoto .............. C22C 38/001
    420/83

FOREIGN PATENT DOCUMENTS

| | | | |
|---|---|---|---|
| EP | 1 362 930 A1 | 11/2003 |
| EP | 2 264 206 A1 | 12/2010 |
| JP | 62-182225 A | 8/1987 |
| JP | 63-86819 A | 4/1988 |
| JP | 8-92655 A | 4/1996 |
| JP | 2001-220647 A | 8/2001 |
| JP | 2001-303175 A | 10/2001 |
| JP | 2002-363693 A | 12/2002 |
| JP | 2005-256020 A | 9/2005 |
| JP | 2007-284783 A | 11/2007 |
| JP | 2007-291514 A | 11/2007 |
| JP | 2009-263718 A | 11/2009 |

OTHER PUBLICATIONS

International Search Report issued in PCT/JP2012/060065 mailed Jul. 17, 2012.
Katoh, H. et al. "Development of New High-Strength Hot-Rolled Steel Sheets," Steelmaking Research, 1984, vol. 312, pp. 41-50.
Kishida, K. "High Strength Steel Sheets for Light Weight Vehicle," Nippon Steel Technical Report, 1999, No. 371, pp. 13-17.
Matsumura, O. et al. "Enhancement of Elongation by Retained Austenite in Intercritical Annealed 0.4C-1.5Si-0.8Mn Steel," Trans. ISIJ, 1987, vol. 27, pp. 570-579.
Sugimoto, K. et al. "Stretch-flangeability of a High-strength TRIP Type Bainitic Sheet Steel," ISIJ International, 2000, vol. 40, No. 9, pp. 920-926.
Written Opinion of the International Searching Authority issued in PCT/JP2012/060065 mailed Jul. 17, 2012.
Mexican Office Action, dated May 18, 2015, for Mexican Application No. 39459.

* cited by examiner

MANUFACTURING METHOD OF A HIGH-STRENGTH COLD-ROLLED STEEL SHEET HAVING EXCELLENT LOCAL DEFORMABILITY

TECHNICAL FIELD

The present invention relates to a high-strength cold-rolled steel sheet having excellent local deformability for bending, stretch flanging, burring, and the like, and is mainly used for automobile parts and the like.

This application is based upon and claims the benefit of priority of the prior Japanese Patent Application No. 2011-089250, filed on Apr. 13, 2011, the entire contents of which are incorporated herein by reference.

BACKGROUND ART

In order to abate emission of carbon dioxide gas from automobiles, a reduction in weight of automobile vehicle bodies has been promoted by using high-strength steel sheets. Further, in order also to secure the safety of a passenger, a high-strength steel sheet has been increasingly used for an automobile vehicle body in addition to a soft steel sheet. In order to further promote the reduction in weight of automobile vehicle bodies from now on, a usage strength level of the high-strength steel sheet has to be increased more than conventionally, and in order to use the high-strength steel sheet for an underbody part, for example, local deformability for burring has to be improved.

However, when a steel sheet is increased in strength in general, formability decreases, and as shown in Non-Patent Document 1, uniform elongation important for drawing and bulging decreases. In contrast to this, as shown in Non-Patent Document 2, there is disclosed a method of securing uniform elongation even with the same strength by making a metal structure of a steel sheet complex.

Meanwhile, there is also disclosed a metal structure control method of a steel sheet that improves local ductility typified by bending, hole expanding, and burring. Non-Patent Document 3 discloses that controlling inclusions, making a structure uniform, and further decreasing hardness difference between structures are effective for bendability and hole expanding.

This is to improve hole expandability by making a structure uniform by structure control, but in order to make a structure uniform, as shown in Non-Patent Document 4, a heat treatment from an austenite single phase becomes a basis of manufacture. Further, in order to achieve strength and ductility, Non-Patent Document 4 also discloses a technique in which metal structure control is performed by cooling control after hot rolling, precipitates are controlled, and a transformation structure is controlled, thereby obtaining appropriate fractions of ferrite and bainite.

Meanwhile, Patent Document 1 discloses a method in which a finishing temperature of hot rolling, a reduction ratio and a temperature range of finish rolling are controlled, recrystallization of austenite is promoted, development of a rolled texture is suppressed, and crystal orientations are randomized, thereby improving strength, ductility, and hole expandability.

PRIOR ART DOCUMENT

Patent Document

Patent Document 1: Japanese Laid-open Patent Publication No. 2009-263718

Non-patent Document

Non-Patent Document 1: Kishida, Nippon Steel Technical Report (1999) No. 371, p. 13

Non-Patent Document 2: O. Matsumura et al., Trans. ISIJ (1987) vol. 27, p. 570

Non-Patent Document 3: Kato et al., Steelmaking Research (1984) vol. 312, p. 41

Non-Patent Document 4: K. Sugimoto et al., ISIJ International (2000) Vol. 40, p. 920

DISCLOSURE OF THE INVENTION

Problems to Be Solved by the Invention

As described above, the main cause of deterioration of local deformability is various "non-uniformities" of hardness difference between structures, non-metal inclusions, a developed rolled texture, and the like. The most effective one among them is the hardness difference between structures described in Non-Patent Document 3 above, and as another effective controlling factor, the developed rolled texture described in Patent Document 1 can be cited. These elements are mixed in a complex manner, and the local deformability of a steel sheet is determined. Therefore, for maximizing an increased margin of the local deformability by texture control, structure control is performed in a combined manner, and it is necessary to eliminate the non-uniformity ascribable to the hardness difference between structures as mush as possible.

Thus, the present invention is to provide a high-strength cold-rolled steel sheet having excellent local deformability capable of improving local ductility of the high-strength steel sheet and also capable of improving anisotropy in the steel sheet by making a metal structure in which an area ratio of bainite is 95% or more, together with controlling a texture, and a manufacturing method thereof.

Means for Solving the Problems

According to the conventional knowledge, as described above, the improvements of hole expandability, bendability, and the like have been performed by inclusion control, making precipitates fine, structure homogenization, turning structures into a single phase, a decrease in hardness difference between structures, and the like. However, these are not sufficient, so that an effect on anisotropy is concerned in a high-strength steel sheet to which Nb, Ti, and the like are added. This causes problems that other forming factors are sacrificed, the direction in which a blank before forming is taken is limited, and the like, and use is also limited.

Thus, the present inventors, in order to improve hole expandability and bending workability, newly focused attention on the effect of a texture of a steel sheet and examined and studied its functional effect in detail. As a result, they revealed that by controlling intensities of respective orientations of a specific crystal orientation group, the local deformability improves drastically without the elongation and strength decreasing greatly. The point where emphasis should be placed is that they also revealed that an improved margin of the local deformability by the texture control greatly relays on a steel structure, a metal structure in which an area ratio of bainite is 95% or more is made, and thereby the improved margin of the local deformability is maximized on the basis that the strength of the steel is secured. Additionally, they found that in a structure in which intensities of respective orientations of a specific crystal orientation group are controlled, the size of a grain unit greatly affects the local ductility.

Generally, in a structure in which low-temperature generating phases (bainite, martensite, and the like) are mixed, the definition of crystal grains is extremely vague and quantification of them is difficult. In contrast to this, the present inventors found it possible to solve the problem of the quantification of crystal grains if a "grain unit" of crystal grains is determined in the following manner.

The "grain unit" of crystal grains determined in the present invention is determined in the following manner in an analysis of orientations of a steel sheet by an EBSP (Electron Back Scattering Pattern). That is, in an analysis of orientations of a steel sheet by an EBSP, for example, orientations are measured at 1500 magnifications with a measured step of 0.5 µm or less, and a position at which a misorientation between adjacent measured points exceeds 15° is set to a boundary between crystal grains. Then, a region surrounded with this boundary is determined to be the "grain unit" of crystal grains.

With respect to crystal grains of the grain unit determined in this manner, a circle-equivalent diameter d is obtained and the volume of each grain unit is obtained by $4/3\pi d^3$. Then, a weighted mean of the volume is calculated and a mean volume diameter (Mean Volume Diameter) is obtained.

[1]

The present invention is constituted based on the previously described knowledge and the gist thereof is as follows. A high-strength cold-rolled steel sheet having excellent local deformability contains:
in mass %,
C: not less than 0.02% nor more than 0.20%;
Si: not less than 0.001% nor more than 2.5%;
Mn: not less than 0.01% nor more than 4.0%;
P: not less than 0.001% nor more than 0.15%;
S: not less than 0.0005% nor more than 0.03%;
Al: not less than 0.001% nor more than 2.0%;
N: not less than 0.0005% nor more than 0.01%; and
O: not less than 0.0005% nor more than 0.01%; in which
Si+Al is limited to less than 1.0%, and
a balance being composed of iron and inevitable impurities, in which
an area ratio of bainite in a metal structure is 95% or more, at a sheet thickness center portion being a range of 5/8 to 3/8 in sheet thickness from the surface of the steel sheet, an average value of pole densities of the {100}<011> to {223}<110> orientation group represented by respective crystal orientations of {100}<011>, {116}<110>, {114}<110>, {113}<110>, {112}<110>, {335}<110>, and {223}<110> is 4.0 or less, and a pole density of the {332}<113> crystal orientation is 5.0 or less, and
a mean volume diameter of crystal grains in the metal structure is 7 µm or less.

[2]

The high-strength cold-rolled steel sheet having excellent local deformability according to [1], in which
to crystal grains of the bainite, a ratio of the crystal grains in which a ratio of a length dL in a rolling direction to a length dt in a sheet thickness direction: dL/dt is 3.0 or less is 50% or more.

[3]

The high-strength cold-rolled steel sheet having excellent local deformability according to [1], further contains:
one type or two or more types of
in mass %,
Ti: not less than 0.001% nor more than 0.20%,
Nb: not less than 0.001% nor more than 0.20%,
V: not less than 0.001% nor more than 1.0%, and
W: not less than 0.001% nor more than 1.0%.

[4]

The high-strength cold-rolled steel sheet having excellent local deformability according to [1], further contains:
one type or two or more types of
in mass %,
B: not less than 0.0001% nor more than 0.0050%,
Mo: not less than 0.001% nor more than 1.0%,
Cr: not less than 0.001% nor more than 2.0%,
Cu: not less than 0.001% nor more than 2.0%,
Ni: not less than 0.001% nor more than 2.0%,
Co: not less than 0.0001% nor more than 1.0%,
Sn: not less than 0.0001% nor more than 0.2%,
Zr: not less than 0.0001% nor more than 0.2%, and
As: not less than 0.0001% nor more than 0.50%.

[5]

The high-strength cold-rolled steel sheet having excellent local deformability according to [1], further contains:
one type or two or more types of
in mass %,
Mg: not less than 0.0001% nor more than 0.010%,
REM: not less than 0.0001% nor more than 0.1%, and
Ca: not less than 0.0001% nor more than 0.010%.

[6]

The high-strength cold-rolled steel sheet having excellent local deformability according to [1], in which
on the surface, a hot-dip galvanized layer or an alloyed hot-dip galvanized layer is provided.

[7]

A manufacturing method of a high-strength cold-rolled steel sheet having excellent local deformability, includes:
on a steel billet containing:
in mass %,
C: not less than 0.02% nor more than 0.20%;
Si: not less than 0.001% nor more than 2.5%;
Mn: not less than 0.01% nor more than 4.0%;
P: not less than 0.001% nor more than 0.15%;
S: not less than 0.0005% nor more than 0.03%;
Al: not less than 0.001% nor more than 2.0%;
N: not less than 0.0005% nor more than 0.01%; and
O: not less than 0.0005% nor more than 0.01%; in which
Si+Al is limited to less than 1.0%, and
a balance being composed of iron and inevitable impurities,
performing first hot rolling in which rolling at a reduction ratio of 40% or more is performed one time or more in a temperature range of not lower than 1000° C. nor higher than 1200° C.;
setting an austenite grain diameter to 200 µm or less by the first hot rolling; performing second hot rolling in which rolling at a reduction ratio of 30% or more is performed in one pass at least one time in a temperature region of not lower than a temperature T1+30° C. nor higher than T1+200° C. determined by Expression (1) below;
setting the total reduction ratio in the second hot rolling to 50% or more;
performing final reduction at a reduction ratio of 30% or more in the second hot rolling and then starting primary cooling in such a manner that a waiting time t second satisfies Expression (2) below;
setting an average cooling rate in the primary cooling to 50° C./second or more and performing the primary cooling in a manner that a temperature change is in a range of not lower than 40° C. nor higher than 140° C.;

performing cold rolling at a reduction ratio of not less than 30% nor more than 70%;
performing holding for 1 to 300 second/seconds in a temperature region of Ae3 to 950° C.;
performing secondary cooling at an average cooling rate of not less than 10° C./s nor more than 200° C./s in a temperature region of Ae3 to 500° C.; and performing an overaging heat treatment in which holding is performed for not shorter than t2 seconds satisfying Expression (4) below nor longer than 400 seconds in a temperature region of not lower than 350° C. nor higher than 500° C.

$$T1(°C.)=850+10\times(C+N)\times Mn+350\times Nb+250\times Ti+40\times B+10\times Cr+100\times Mo+100\times V \quad (1)$$

$$t \leq 2.5 \times t1 \quad (2)$$

Here, t1 is obtained by Expression (3) below.

$$t1=0.001\times((Tf-T1)\times P1/100)^2-0.109\times((Tf-T1)\times P1/100)+3.1 \quad (3)$$

Here, in Expression (3) above, Tf represents the temperature of the steel billet obtained after the final reduction at a reduction ratio of 30% or more, and P1 represents the reduction ratio of the final reduction at 30% or more.

$$\log(t2)=0.0002(T2-425)^2+1.18 \quad (4)$$

Here, T2 represents an overaging treatment temperature, and the maximum value of t2 is set to 400.

[8]
The manufacturing method of the high-strength cold-rolled steel sheet having excellent local deformability according to [7], in which the total reduction ratio in a temperature range of lower than T1+30° C. is 30% or less.

[9]
The manufacturing method of the high-strength cold-rolled steel sheet having excellent local deformability according to [7], in which the waiting time t second further satisfies Expression (2a) below.

$$t<t1 \quad (2a)$$

[10]
The manufacturing method of the high-strength cold-rolled steel sheet having excellent local deformability according to [7], in which the waiting time t second further satisfies Expression (2b) below.

$$t1 \leq t \leq t1 \times 2.5 \quad (2b)$$

[11]
The manufacturing method of the high-strength cold-rolled steel sheet having excellent local deformability according to [7], in which the primary cooling is started between rolling stands.

[12]
The manufacturing method of the high-strength cold-rolled steel sheet having excellent local deformability according to [7], in which when heating is performed up to the temperature region of Ae3 to 950° C. after the cold rolling, an average heating rate of not lower than room temperature nor higher than 650° C. is set to HR1 (° C./second) expressed by Expression (5) below, and
an average heating rate of higher than 650° C. to Ae3 to 950° C. is set to HR2 (° C./second) expressed by Expression (6) below.

$$HR1 \geq 0.3 \quad (5)$$

$$HR2 \leq 0.5 \times HR1 \quad (6)$$

[13]

The manufacturing method of the high-strength cold-rolled steel sheet having excellent local deformability according to [7], further includes:
forming a hot-dip galvanized layer or an alloyed hot-dip galvanized layer on the surface.

Effect of the Invention

According to the present invention, it is possible to obtain a high-strength cold-rolled steel sheet having excellent local deformability for bending, stretch flanging, burring, and the like by controlling a texture and a steel structure of the steel sheet.

MODE FOR CARRYING OUT THE INVENTION

Hereinafter, the contents of the present invention will be explained in detail.
(Crystal Orientation)
First, there will be explained an average value of pole densities of the {100}<011> to {223}<110> orientation group and a pole density of the {332}<113> crystal orientation at a sheet thickness center portion being a range of ⅝ to ⅜ in sheet thickness from a surface of a steel sheet.

In a cold-rolled steel sheet of the present invention, an average value of pole densities of the {100}<011> to {223}<110> orientation group and a pole density of the {332}<113> crystal orientation at a sheet thickness center portion being a range of ⅝ to ⅜ in sheet thickness from the surface of the steel sheet are particularly important characteristic values.

Figure 1:
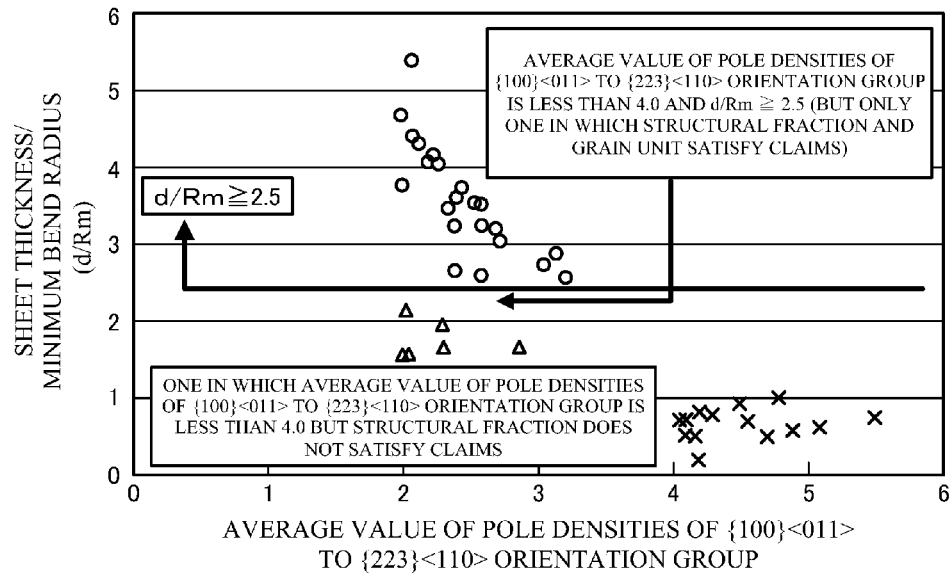
FIG. 1 shows the relationship between an average value of pole densities of the {100}<011>to {223}<110>orientation group and a sheet thickness/a minimum bend radius.

As shown in FIG. 1, when X-ray diffraction is performed at the sheet thickness center portion being the range of ⅝ to ⅜ in sheet thickness from the surface of the steel sheet to obtain pole densities of respective orientations, the average value of the pole densities of the {100}<011> to {223}<110> orientation group is less than 4.0 and it is possible to satisfy a sheet thickness/a bend radius ≥1.5 that is required to work a framework part to be required recently. Additionally, when in a steel structure, 95% or more of a bainite fraction is satisfied, the sheet thickness/the bend radius ≥2.5 is satisfied. When hole expandability and small limited bendability are required, the average value of the pole densities of the {100}<011> to {223}<110> orientation group is desirably less than 3.0.

When this value is 4.0 or more, anisotropy of mechanical properties of the steel sheet becomes strong extremely, and further local deformability only in a certain direction is improved, but a material in a direction different from it deteriorates significantly, resulting in that it becomes impossible to satisfy the sheet thickness/the bend radius ≥1.5. On the other hand, when this value becomes less than 0.5, which is difficult to be achieved in a current general continuous hot rolling process, the deterioration of the local deformability is concerned.

The {100}<011>, {116}<110>, {114}<110>, {113}<110>, {112}<110>, {335}<110>, and {223}<110> orientations are included in this orientation group.

The pole density is synonymous with an X-ray random intensity ratio. The pole density (X-ray random intensity ratio) is a numerical value obtained by measuring X-ray intensities of a standard sample not having accumulation in a specific orientation and a test sample under the same conditions by X-ray diffractometry or the like and dividing the obtained X-ray intensity of the test sample by the X-ray intensity of the standard sample. This pole density can be measured by any one of X-ray diffraction, an EBSP (Electron Back Scattering Pattern) method, and an ECP (Electron Channeling Pattern) method.

As for the pole density of the {100}<011> to {223}<110> orientation group, for example, pole densities of respective orientations of {100}<011>, {116}<110>, {114}<110>, {112}<110>, and {223}<110> are obtained from a three-dimensional texture (ODF) calculated by a series expansion method using a plurality (preferably three or more) of pole figures out of pole figures of {110}, {100}, {211}, and {310} measured by the method, and these pole densities are arithmetically averaged, and thereby the pole density of the above-described orientation group is obtained. Incidentally, when it is impossible to obtain the intensities of all the above-described orientations, the arithmetic average of the pole densities of the respective orientations of {100}<011>, {116}<110>, {114}<110>, {112}<110>, and {223}<110> may also be used as a substitute.

For example, for the pole density of each of the above-described crystal orientations, each of intensities of (001)[1-10], (116)[1-10], (114)[1-10], (113)[1-10], (112)[1-10], (335)[1-10], and (223)[1-10] at a φ2=45° cross-section in the three-dimensional texture may be used as it is.

Figure 2:
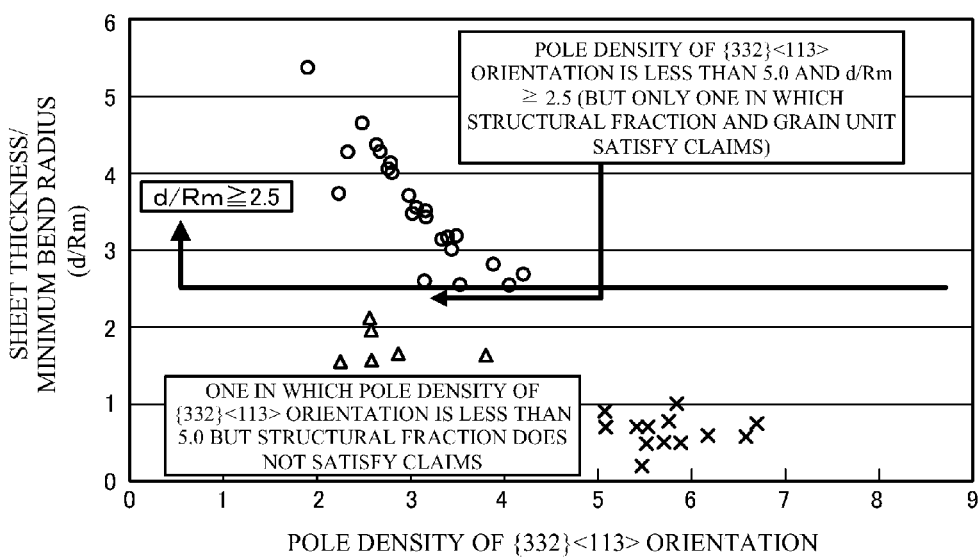
FIG. 2 shows the relationship between a pole density of the {332}<113> crystal orientation and the sheet thickness/the minimum bend radius.

Further, due to the similar reason, the pole density of the {332}<113> crystal orientation of the sheet plane at the sheet thickness center portion being the range of 5/8 to 3/8 in sheet thickness from the surface of the steel sheet has to be 5.0 or less as shown in FIG. 2. As long as it is 3.0 or less desirably, the sheet thickness/the bend radius ≥1.5 that is required to work a framework part to be required recently is satisfied. Additionally, when in the steel structure, 95% or more of the bainite fraction is satisfied, the sheet thickness/the bend radius ≥2.5 is satisfied. On the other hand, when the pole density of the {332}<113> crystal orientation is greater than 5.0, the anisotropy of the mechanical properties of the steel sheet becomes strong extremely, and further the local deformability only in a certain direction is improved, but the material in a direction different from it deteriorates significantly, resulting in that it becomes impossible to securely satisfy the sheet thickness/the bend radius ≥1.5. Further, when the pole density becomes less than 0.5, which is difficult to be achieved in a current general continuous hot rolling process, the deterioration of the local deformability is concerned.

The reason why the pole densities of the above-described crystal orientations are important for shape freezing property at the time of bending working is not necessarily obvious, but is inferentially related to slip behavior of crystal at the time of bending deformation.

With regard to the sample to be subjected to the X-ray diffraction, EBSP method, or ECP method, the steel sheet is reduced in thickness to a predetermined sheet thickness from the surface by mechanical polishing or the like. Next, strain is removed by chemical polishing, electrolytic polishing, or the like, and the sample is fabricated in such a manner that in the range of 5/8 to 3/8 in sheet thickness, an appropriate plane becomes a measuring plane. For example, on a steel piece in a size of 30 mmφ cut out from the position of ¼ W or ¾ W of the sheet width W, grinding with fine finishing (centerline average roughness Ra: 0.4a to 1.6a) is performed. Next, by chemical polishing or electrolytic polishing, strain is removed, and the sample to be subjected to the X-ray diffraction is fabricated. With regard to the sheet width direction, the steel piece is desirably taken from, of the steel sheet, the position of ¼ or ¾ from an end portion.

As a matter of course, the pole density satisfies the above-described pole density limited range not only at the sheet thickness center portion being the range of 5/8 to 3/8 in sheet thickness from the surface of the steel sheet, but also at as many thickness positions as possible, and thereby local ductility performance (local elongation) is further improved. However, the range of 5/8 to 3/8 from the surface of the steel sheet is measured, to thereby make it possible to represent the material property of the entire steel sheet generally. Thus, 5/8 to 3/8 of the sheet thickness is prescribed as the measuring range.

Incidentally, the crystal orientation represented by {hkl}<uvw> means that the normal direction of the steel sheet plane is parallel to <hkl> and the rolling direction is parallel to <uvw>. With regard to the crystal orientation, normally, the orientation vertical to the sheet plane is represented by [hkl] or {hkl} and the orientation parallel to the rolling direction is represented by (uvw) or <uvw>. {hkl} and <uvw> are generic terms for equivalent planes, and [hkl] and (uvw) each indicate an individual crystal plane. That is, in the present invention, a body-centered cubic structure is targeted, and thus, for example, the (111), (−111), (1−11), (11−1), (−1−11), (−11−1), (1−1−1), and (−1−1−1) planes are equivalent to make it impossible to make them different. In such a case, these orientations are generically referred to as {111}. In an ODF representation, [hkl] (uvw) is also used for representing orientations of other low symmetric crystal structures, and thus it is general to represent each orientation as [hkl](uvw), but in the present invention, [hkl](uvw) and {hkl}<uvw> are synonymous with each other. The measurement of crystal orientation by an X ray is performed according to the method described in, for example, Cullity, Elements of X-ray Diffraction, new edition (published in 1986, translated by MATSUMURA, Gentaro, published by AGNE Inc.) on pages 274 to 296.

(Mean Volume Diameter of Crystal Grains)

The present inventors earnestly examined texture control of a hot-rolled steel sheet. As a result, it was found that under the condition that a texture is controlled as described above, the effect of crystal grains in a grain unit on the local ductility is extremely large and the crystal grains are made fine, thereby making it possible to obtain drastic improvement of the local ductility. Incidentally, as described above, the "grain unit" of the crystal grains is determined in a manner that the position at which a misorientation exceeds 15° is set as a boundary of crystal grains in an analysis of orientations of the steel sheet by the EBSP.

As above, the reason why the local ductility improves is not obvious. However, it is conceivably because when the texture of the steel sheet is randomized and the crystal grains are made fine, local strain concentration to occur in micron order is suppressed, homogenization of deformation is increased, and strain is dispersed uniformly in micron order.

As there are more large crystal grains even though the number of them is small, the deterioration of the local ductility becomes larger. Therefore, the size of the crystal grains is not an ordinary size mean, and a mean volume diameter defined as a weighted mean of volume is strongly correlated with the local ductility. In order to obtain this effect, the mean volume diameter of the crystal grains needs to be 7 μm or less. It is desirably 5 μm or less in order to secure the hole expandability at a higher level. Incidentally, the method of measuring crystal grains is set as described previously.

(Equiaxial Property of Crystal Grains)

As a result of further pursuit of the local ductility, the present inventors also found that when equiaxial property of the crystal grains is excellent on the condition that the above-described texture and the size of the crystal grains are satisfied, the local ductility improves. As an index indicating this equiaxial property, with respect to the crystal grains expressed by the grain unit, a ratio of the grains excellent in equiaxial property in which dL/dt, being a ratio of, of the crystal grains, a length dL in a cold rolling direction to a length dt in a sheet thickness direction, is 3.0 or less needs to be at least 50% or more to all the bainite grains.

(Chemical Composition)

Subsequently, there will be described limiting conditions of components. Incidentally, % of each content is mass %.

C: not less than 0.02% nor more than 0.20%

The lower limit of C is set to 0.02% in order to have 95% or more of bainite in the steel structure. Further, C is an element increasing strength, to thus be preferably set to 0.025% or more in order to secure the strength. On the other hand, when the C content exceeds 0.20%, weldability is sometimes impaired, and workability sometimes deteriorates extremely due to an increase in a hard structure, and thus the upper limit is set to 0.20%. Further, when the C content exceeds 0.10%, formability deteriorates, so that the C content is preferably set to 0.10% or less.

Si: not less than 0.001% nor more than 2.5%

Si is an element effective for increasing mechanical strength of the steel sheet, but when Si becomes greater than 2.5%, the workability deteriorates and a surface flaw occurs, so that this is set to the upper limit. Further, when the Si content is large, a chemical conversion treatment property decreases, so that Si is preferably set to 1.20% or less. On the other hand, it is difficult to set Si to less than 0.001% in a practical steel, so that this is set to the lower limit.

Mn: not less than 0.01% nor more than 4.0%

Mn is also an element effective for increasing the mechanical strength of the steel sheet, but when Mn becomes greater than 4.0%, the workability deteriorates, so that this is set to the upper limit. On the other hand, it is difficult to set Mn to less than 0.01% in a practical steel, so that this is set to the lower limit. Further, when elements such as Ti that suppress occurrence of hot cracking caused by S are not sufficiently added except Mn, the Mn amount satisfying Mn/S≥20 in mass % is desirably added. Further, Mn is an element that, with an increase in the content, expands an austenite region temperature to a low temperature side, improves hardenability, and facilitates formation of a continuous cooling transformation structure having excellent burring workability. This effect is not easily exhibited when the Mn content is less than 1%, so that 1% or more is desirably added.

P: not less than 0.001% nor more than 0.15%

S: not less than 0.0005% nor more than 0.03%

With regard to the upper limits of P and S, P is set to 0.15% or less and S is set to 0.03% or less respectively. This is to prevent deterioration of the workability and cracking at the time of hot rolling or cold rolling. With regard to the lower limits of P and S, P is set to 0.001% and S is set to 0.0005%, as values applicable in current general refining (including secondary refining).

Al: not less than 0.001% nor more than 2.0%

For deoxidation, 0.001% or more of Al is added. When deoxidation is needed sufficiently, 0.01% or more is preferably added. Further, Al is also an element significantly increasing a γ to α transformation point. However, when it is too much, the weldability deteriorates, so that the upper limit is set to 2.0%. It is preferably set to 1.0% or less.

N: not less than 0.0005% nor more than 0.01%

O: not less than 0.0005% nor more than 0.01%

N and O are impurities, and are both set to 0.01% or less in order to prevent the workability from deteriorating. The lower limits of the both elements are set to 0.0005% that is applicable in current general refining (including secondary refining). However, they are preferably set to 0.001% or more in order to suppress an extreme increase in steelmaking cost.

Si+Al: less than 1.0%

When Si and Al are contained excessively, cementite precipitation during an overaging treatment is suppressed and the fraction of retained austenite becomes too large, so that the total added amount of Si and Al is set to less than 1%.

Ti: not less than 0.001% nor more than 0.20%

Nb: not less than 0.001% nor more than 0.20%

V: not less than 0.001% nor more than 1.0%

W: not less than 0.001% nor more than 1.0%

Further, when the strength is obtained by precipitation strengthening, it is preferred to generate fine carbonitride. For obtaining precipitation strengthening, it is effective to add Ti, Nb, V, and W, and one type or two or more types of them may be contained.

In order to obtain this effect by adding Ti, Nb, V, and W, it is necessary to add 0.001% of Ti, 0.001% of Nb, 0.001% or more of V, and 0.001% or more of W. When the precipitation strengthening is particularly needed, it is desired to add 0.01% or more of Ti, 0.005% or more of Nb, 0.01% or more of V, and 0.01% or more of W. However, even when they are added excessively, the strength increase is saturated, and additionally recrystallization after hot rolling is suppressed, to thereby make it difficult to perform crystal orientation control after cold rolling annealing, so that Ti needs to be set to 0.20% or less, Nb needs to be set to 0.20% or less, V needs to be set to 1.0% or less, and W needs to be set to 1.0% or less.

B: not less than 0.0001% nor more than 0.0050%

Mo: not less than 0.001% nor more than 1.0%

Cr: not less than 0.001% nor more than 2.0%

Cu: not less than 0.001% nor more than 2.0%

Ni: not less than 0.001% nor more than 2.0%

Co: not less than 0.0001% nor more than 1.0%

Sn: not less than 0.0001% nor more than 0.2%

Zr: not less than 0.0001% nor more than 0.2%

As: not less than 0.0001% nor more than 0.50%

When the strength is secured by increasing the hardenability of the structure to perform second phase control, it is effective to add one type or two or more types of B, Mo, Cr, Cu, Ni, Co, Sn, Zr, and As. In order to obtain this effect, it is necessary to add 0.0001% or more of B, 0.001% or more of each of Mo, Cr, Cu, and Ni, and 0.0001% or more of each of Co, Sn, Zr, and As. However, when they are added excessively, the workability is deteriorated by contraries, so that the upper limit of B is set to 0.0050%, the upper limit of Mo is set to 1.00%, the upper limit of each of Cr, Cu, and Ni is set to 2.0%, the upper limit of Co is set to 1.0%, the upper limit of each of Sn and Zr is set to 0.2%, and the upper limit of As is set to 0.50%.

Mg: not less than 0.0001% nor more than 0.010%
REM: not less than 0.0001% nor more than 0.1%
Ca: not less than 0.0001% nor more than 0.010%

Mg, REM, and Ca are important elements to be added for improving local formability and making inclusions harmless. In order to obtain this effect, the lower limit of each of them is set to 0.0001%. On the other hand, excessive additions lead to deterioration of cleanliness, so that 0.010% is set as the upper limit of Mg, 0.1% is set as the upper limit of REM, and 0.010% is set as the upper limit of Ca.

(Metal Structure)

Next, there will be explained a metal structure of the cold-rolled steel sheet of the present invention.

The metal structure of the cold-rolled steel sheet of the present invention has a bainite area ratio of 95% or more and is preferably a bainite single phase. This is because the metal structure is composed of bainite, thereby making it possible to achieve the strength and the hole expandability. Further, this structure is generated by transformation at relatively high temperature, to thus have no necessity to be cooled down to low temperature when being manufactured, and is a preferred structure also in terms of material stability and productivity.

As the balance, 5% or less of pro-eutectoid ferrite, pearlite, martensite, and retained austenite is allowed. Pro-eutectoid ferrite has no problem as long as it is precipitation-strengthened sufficiently, but pro-eutectoid ferrite sometimes becomes soft depending on the chemical composition, and when the area ratio becomes greater than 5%, the hole expandability slightly decreases due to hardness difference from bainite. Further, when an area ratio of pearlite becomes greater than 5%, the strength and the workability sometimes deteriorate. When area ratios of martensite and retained austenite to be strain-induced transformed to martensite become 1% or more and greater than 5% respectively, an interface between bainite and a structure harder than bainite becomes a starting point of cracking and the hole expandability deteriorates.

Thus, as long as the area ratio of bainite is set to 95% or more, the area ratio of pro-eutectoid ferrite, pearlite, martensite, and retained y being the balance becomes 5% or less, so that the strength and the hole expandability are well balanced. However, it is necessary to set martensite to less than 1% as described above.

Here, bainite in the present invention is a microstructure defined as a continuous cooling transformation structure (Zw) positioned at an intermediate stage between a microstructure containing polygonal ferrite and pearlite to be generated by a diffusive mechanism and martensite to be generated by a non-diffusive shearing mechanism, as is described in The Iron and Steel Institute of Japan, Society of basic research, Bainite Research Committee/Edition; Recent Research on Bainitic Microstructures and Transformation Behavior of Low Carbon Steels—Final Report of Bainite Research Committee (in 1994, The Iron and Steel Institute of Japan).

That is, the continuous cooling transformation structure (Zw) is defined as a microstructure mainly composed of Bainitic ferrite ($\alpha°_B$), Granular bainitic ferrite ($\alpha_B$), and Quasi-polygonal ferrite ($\alpha_q$), and further containing a small amount of retained austenite ($\gamma_r$) and Martensite-austenite (MA) as is described in the above-described reference literature on pages 125 to 127 as an optical microscopic observation structure.

Incidentally, similarly to polygonal ferrite (PF), an internal structure of $\alpha_q$ does not appear by etching, but a shape of $\alpha_q$ is acicular, and it is definitely distinguished from PF. Here, on the condition that of a targeted crystal grain, a peripheral length is set to lq and a circle-equivalent diameter is set to dq, a grain having a ratio (lq/dq) of them satisfying lq/dq ≥3.5 is $\alpha_q$.

The continuous cooling transformation structure (Zw) of the present invention is defined as a microstructure containing one type or two or more types of $\alpha°_B$, $\alpha_B$, $\alpha_q$, $\gamma_r$, and MA. Incidentally, the total content of $\gamma_r$ and MA being small in amount is set to 3% or less.

There is sometimes a case that this continuous cooling transformation structure (Zw) is not easily discerned by observation by optical microscope in etching using a nital reagent. In such a case, it is discerned by using the EBSP-OIM™.

The EBSP-OIM (Electron Back Scatter Diffraction Pattern-Orientation Image Microscopy, registered trademark) method is constituted by a device and software in which a highly inclined sample in a scanning electron microscope SEM (Scanning Electron Microscope) is irradiated with electron beams, a Kikuchi pattern formed by backscattering is photographed by a high-sensitive camera and is image processed by a computer, and thereby a crystal orientation at an irradiation point is measured for a short time period.

In the EBSP method, it is possible to quantitatively analyze a microstructure and a crystal orientation of a bulk sample surface, and as long as an area to be analyzed is within an area capable of being observed by the SEM, it is possible to analyze the area with a minimum resolution of 20 nm, depending on the resolution of the SEM. The analysis by the EBSP-OIM method is performed by mapping an area to be analyzed to tens of thousands of equally-spaced grid points for several hours. It is possible to see crystal orientation distributions and sizes of crystal grains within the sample in a polycrystalline material. In the present invention, one discernible from a mapped image with a misorientation between packets defined as 15° may also be defined as the continuous cooling transformation structure (Zw) for convenience.

Further, the structural fraction of pro-eutectoid ferrite was obtained by a KAM (Kernel Average Misorientation) method being equipped with the EBSP-OIM. The KAM method is that a calculation, in which misorientations among pixels of adjacent six pixels (first approximations) of a certain regular hexagon of measurement data, or 12 pixels (second approximations) positioned outside the six pixels, or 18 pixels (third approximations) positioned further outside the 12 pixels are averaged and an obtained value is set to a value of the center pixel, is performed with respect to each pixel.

This calculation is performed so as not to exceed a grain boundary, thereby making it possible to create a map representing an orientation change within a grain. That is, this map represents a distribution of strain based on a local orientation change within a grain. Note that as the analysis condition in the present invention, the condition of which in the EBSP-OIM, the misorientation among adjacent pixels is calculated is set to the third approximation and one having this misorientation being 5° or less is displayed.

In the present invention, pro-eutectoid ferrite is defined as a microstructure up to a planar fraction of pixels of which misorientation third approximation is calculated to be 1° or less as described above. This is because polygonal pro-eutectoid ferrite transformed at high temperature is generated in a diffusion transformation, and thus a dislocation density is small and strain within the grain is small, and thus, a difference within the grain in the crystal orientation is small, and according to the results of various examinations that have been performed so far by the present inventors, a volume fraction of polygonal ferrite obtained by observation of optical microscope and an area fraction of an area obtained by 1° of the misorientation third approximation measured by the KAM method substantially agree with each other.

(Manufacturing Method)

Next, there will be described a manufacturing method of the cold-rolled steel sheet of the present invention. In order to achieve excellent local deformability, it is important to form a texture having predetermined pole densities and to manufacture a steel sheet satisfying conditions of making crystal grains fine and equiaxial property and homogenization of crystal grains. Details of manufacturing conditions for satisfying them at the same time will be described below.

A manufacturing method prior to hot rolling is not limited in particular. That is, subsequent to melting by a shaft furnace, an electric furnace, or the like, secondary refining may be variously performed, and next casting may be performed by normal continuous casting, or casting by an ingot method, or further a method such as thin slab casting. In the case of continuous casting, it is possible that a cast slab is once cooled down to low temperature and thereafter is reheated to then be subjected to hot rolling, or it is also possible that a cast slab is subjected to hot rolling continuously. A scrap may also be used for a raw material.

Further, in hot rolling, it is also possible that sheet bars are bonded after rough rolling to be subjected to finish rolling continuously. On this occasion, it is also possible that rough bars are coiled into a coil shape once, stored in a cover having a heat insulating function according to need, and uncoiled again to then be joined.

(First Hot Rolling)

A slab extracted from a heating furnace is subjected to a rough rolling process being first hot rolling to be rough rolled, and thereby a rough bar is obtained. A high-strength steel sheet having excellent local deformability of the present invention is obtained when the following requirements are satisfied. First, an austenite grain diameter in the rough bar after the rough rolling, namely before the finish rolling is important and the austenite grain diameter before the finish rolling is desirably small, and it became clear that the austenite grain diameter of 200 μm or less greatly contributes to making grains fine in the grain unit and homogenization of a main phase.

Figure 3:
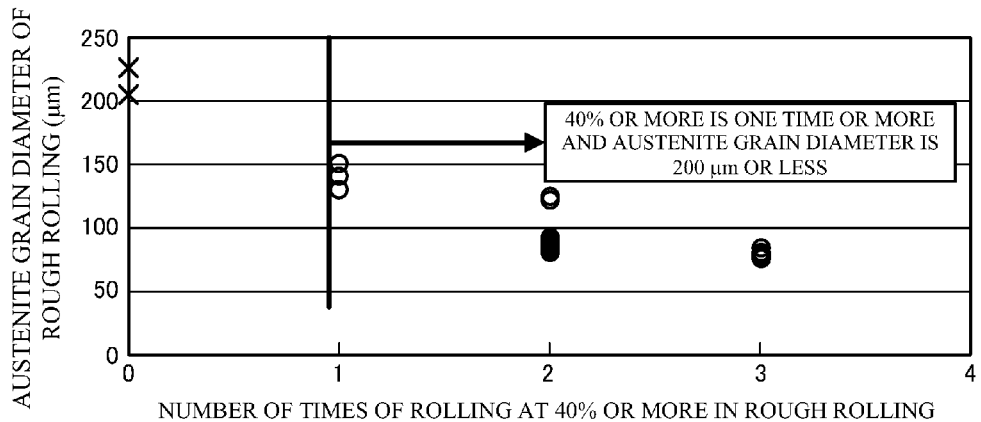
FIG. 3 shows the relationship between the number of times of rolling at 40% or more in rough rolling and an austenite grain diameter in the rough rolling.

In order to obtain this austenite grain diameter of 200 μm or less before the finish rolling, as shown in FIG. 3, in rough rolling in a temperature region of not lower than 1000° C. nor higher than 1200° C., rolling is performed one time or more at a reduction ratio of at least 40% or more.

As the reduction ratio and the number of times of reduction are larger, fine grains can be obtained, and in order to efficiently obtain this effect, the austenite grain diameter is desirably set to 100 μm or less, and in order to achieve it, rolling at 40% or more is desirably performed two times or more. However, when in the rough rolling, the reduction ratio is greater than 70% and rolling is performed greater than 10 times, there is a concern that the temperature decreases or a scale is generated excessively.

In this manner, the decrease in the austenite grain diameter before the finish rolling is effective for the improvement of the local deformability through control of recrystallization promotion of austenite in the finish rolling later, making grains fine, and making grains equiaxial of the grain unit in a final structure. It is supposed that this is because an austenite grain boundary after the rough rolling (namely before the finish rolling) functions as one of recrystallization nuclei during the finish rolling.

In order to confirm the austenite grain diameter after the rough rolling, a sheet piece before being subjected to the finish rolling is desirably quenched as much as possible, and the sheet piece is cooled at a cooling rate of 10° C./s or more, and the structure of a cross section of the sheet piece is etched to make austenite grain boundaries appear, and the austenite grain boundaries are measured by an optical microscope. On this occasion, at 50 or more magnifications, 20 visual fields or more are measured by image analysis or a point counting method.

(Second Hot Rolling)

After the rough rolling process (first hot rolling) is completed, a finish rolling process being second hot rolling is started. The time between the completion of the rough rolling process and the start of the finish rolling process is desirably set to 150 seconds or shorter.

In the finish rolling process (second hot rolling), a finish rolling start temperature is desirably set to 1000° C. or higher. When the finish rolling start temperature is lower than 1000° C., at each finish rolling pass, the temperature of the rolling to be applied to the rough bar to be rolled is decreased, the reduction is performed in a non-recrystallization temperature region, the texture develops, and thus the isotropy deteriorates.

Incidentally, the upper limit of the finish rolling start temperature is not limited in particular. However, when it is 1150° C. or higher, a blister to be the starting point of a scaly spindle-shaped scale defect is likely to occur between a steel sheet base iron and a surface scale before the finish rolling and between passes, and thus the finish rolling start temperature is desirably lower than 1150° C.

In the finish rolling, a temperature determined by the chemical composition of the steel sheet is set to T1, and in a temperature region of not lower than T1+30° C. nor higher than T1+200° C., the rolling at 30% or more is performed in one pass at least one time. Further, in the finish rolling, the total reduction ratio is set to 50% or more. By satisfying this condition, at the sheet thickness center portion being the range of 5/8 to 3/8 in sheet thickness from the surface of the steel sheet, the average value of the pole densities of the {100}<011> to {223}<110> orientation group becomes less than 4.0 and the pole density of the {332}<113> crystal orientation becomes 5.0 or less. This makes it possible to obtain the local deformability of a final product.

Here, T1 is the temperature calculated by Expression (1) below.

$$T1(°C.)=850+10\times(C+N)\times Mn+350\times Nb+250\times Ti+40\times B+10\times Cr+100\times Mo+100\times V \quad (1)$$

C, N, Mn, Nb, Ti, B, Cr, Mo, and V each represent the content of the element (mass %).

Figure 4:
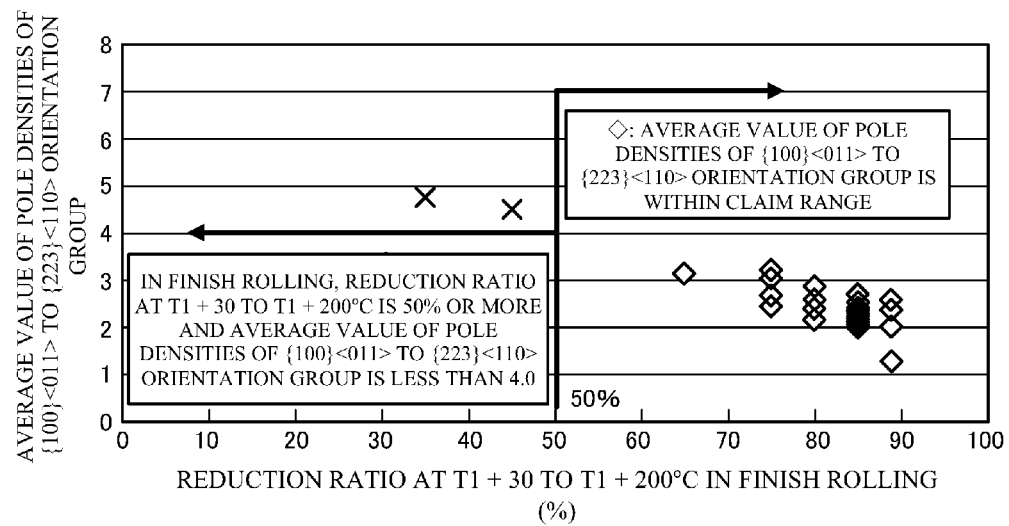
FIG. 4 shows the relationship between a reduction ratio at T1+30 to T1+200° C. and the average value of the pole densities of the {100}<011> to {223}<110> orientation group.
Figure 5:
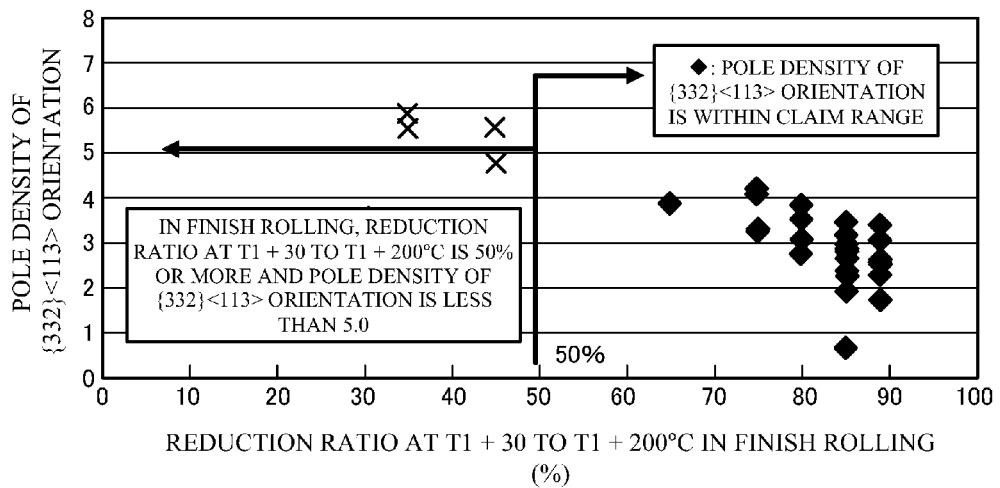
FIG. 5 shows the relationship between the reduction ratio at T1+30 to T1+200° C. and the pole density of the {332}<113> crystal orientation.

FIG. 4 and FIG. 5 each show the relationship between a reduction ratio in each temperature region and a pole density of each orientation. As shown in FIG. 4 and FIG. 5, heavy reduction in the temperature region of not lower than T1+30° C. nor higher than T1+200° C. and light reduction at T1 or higher and lower than T1+30° C. thereafter control the average value of the pole densities of the {100}<011> to {223}<110>orientation group and the pole density of the {332}<113>crystal orientation at the sheet thickness center portion being the range of 5/8 to 3/8 in sheet thickness from the surface of the steel sheet, and thereby the local deformability of the final product is improved drastically, as shown in Tables 2 and 3 of Examples to be described later.

This T1 temperature itself is obtained empirically. The present inventors learned empirically by experiments that the recrystallization in an austenite region of each steel is promoted on the basis of the T1 temperature. In order to obtain better local deformability, it is important to accumulate strain by the heavy reduction, and the total reduction ratio of 50% or more is essential. Further, it is desired to take reduction at 70% or more, and on the other hand, if the reduction ratio greater than 90% is taken, securing temperature and excessive rolling load are as a result added.

When the total reduction ratio in the temperature region of not lower than T1+30° C. nor higher than T1+200° C. is less than 50%, rolling strain to be accumulated during the hot rolling is not sufficient and the recrystallization of austenite does not advance sufficiently. Therefore, the texture develops and the isotropy deteriorates. When the total reduction ratio is 70% or more, the sufficient isotropy can be obtained even though variations ascribable to temperature fluctuation or the like are considered. On the other hand, when the total reduction ratio exceeds 90%, it becomes difficult to obtain the temperature region of T1+200° C. or lower due to heat generation by working, and further a rolling load increases to cause a risk that the rolling becomes difficult to be performed.

In the finish rolling, in order to promote the uniform recrystallization caused by releasing the accumulated strain, the rolling at 30% or more is performed in one pass at least one time at not lower than T1+30° C. nor higher than T1+200° C.

Incidentally, in order to promote the uniform recrystallization, it is necessary to suppress a working amount in a temperature region of lower than T1+30° C. as small as possible. In order to achieve it, the reduction ratio at lower than T1+30° C. is desirably 30% or less. In terms of sheet thickness accuracy and sheet shape, the reduction ratio of 10% or less is desirable. When the isotropy is further obtained, the reduction ratio in the temperature region of lower than T1+30° C. is desirably 0%.

The finish rolling is desirably finished at T1+30° C. or higher. In the hot rolling at lower than T1+30° C., the granulated austenite grains that are recrystallized once are elongated, thereby causing a risk that the isotropy deteriorates.

That is, in the manufacturing method of the present invention, in the finish rolling, by recrystallizing austenite uniformly and finely, the texture of the product is controlled and the local deformability such as the hole expandability or the bendability is improved.

A rolling ratio can be obtained by actual performances or calculation from the rolling load, sheet thickness measurement, or/and the like. The temperature can be actually measured by a thermometer between stands, or can be obtained by calculation simulation considering the heat generation by working from a line speed, the reduction ratio, or/and like. Thereby, it is possible to easily confirm whether or not the rolling prescribed in the present invention is performed.

When the hot rolling is finished at $Ar_3$ or lower, the hot rolling becomes two-phase region rolling of austenite and ferrite, and accumulation to the {100}<011> to {223}<110> orientation group becomes strong. As a result, the local deformability deteriorates significantly.

In order to make the crystal grains fine and suppress elongated grains, a maximum working heat generation amount at the time of the reduction at not lower than T1+30° C. nor higher than T1+200° C., namely a temperature increased margin by the reduction is desirably suppressed to 18° C. or less. For achieving this, inter-stand cooling or the like is desirably applied.

(Primary Cooling)

After the final reduction at a reduction ratio of 30% or more is performed in the finish rolling, primary cooling is started in such a manner that a waiting time t second satisfies Expression (2) below.

$$t \leq 2.5 \times t1 \quad (2)$$

Here, t1 is obtained by Expression (3) below.

$$t1 = 0.001 \times ((Tf-T1) \times P1/100)^2 - 0.109 \times ((Tf-T1) \times P1/100) + 3.1 \quad (3)$$

Here, in Expression (3) above, Tf represents the temperature of a steel billet obtained after the final reduction at a reduction ratio of 30% or more, and P1 represents the reduction ratio of the final reduction at 30% or more.

Incidentally, the "final reduction at a reduction ratio of 30% or more" indicates the rolling performed finally among the rollings whose reduction ratio becomes 30% or more out of the rollings in a plurality of passes performed in the finish rolling. For example, when among the rollings in a plurality of passes performed in the finish rolling, the reduction ratio of the rolling performed at the final stage is 30% or more, the rolling performed at the final stage is the "final reduction at a reduction ratio of 30% or more." Further, when among the rollings in a plurality of passes performed in the finish rolling, the reduction ratio of the rolling performed prior to the final stage is 30% or more and after the rolling performed prior to the final stage (rolling at a reduction ratio of 30% or more) is performed, the rolling whose reduction ratio becomes 30% or more is not performed, the rolling performed prior to the final stage (rolling at a reduction ratio of 30% or more) is the "final reduction at a reduction ratio of 30% or more."

In the finish rolling, the waiting time t second until the primary cooling is started after the final reduction at a reduction ratio of 30% or more is performed greatly affects the austenite grain diameter. That is, it greatly affects an equiaxed grain fraction and a coarse grain area ratio of the steel sheet.

When the waiting time t exceeds t1×2.5, the recrystallization is already almost completed, but the crystal grains grow significantly and grain coarsening advances, and thereby an r value and the elongation are decreased.

The waiting time t second further satisfies Expression (2a) below, thereby making it possible to preferentially suppress the growth of the crystal grains. Consequently, even though the recrystallization does not advance sufficiently, it is possible to sufficiently improve the elongation of the steel sheet and to improve fatigue property simultaneously.

$$t < t1 \quad (2a)$$

At the same time, the waiting time t second further satisfies Expression (2b) below, and thereby the recrystallization advances sufficiently and the crystal orientations are randomized. Therefore, it is possible to sufficiently improve the elongation of the steel sheet and to greatly improve the isotropy simultaneously.

$$t1 \leq t \leq t1 \times 2.5 \quad (2b)$$

Figure 6:
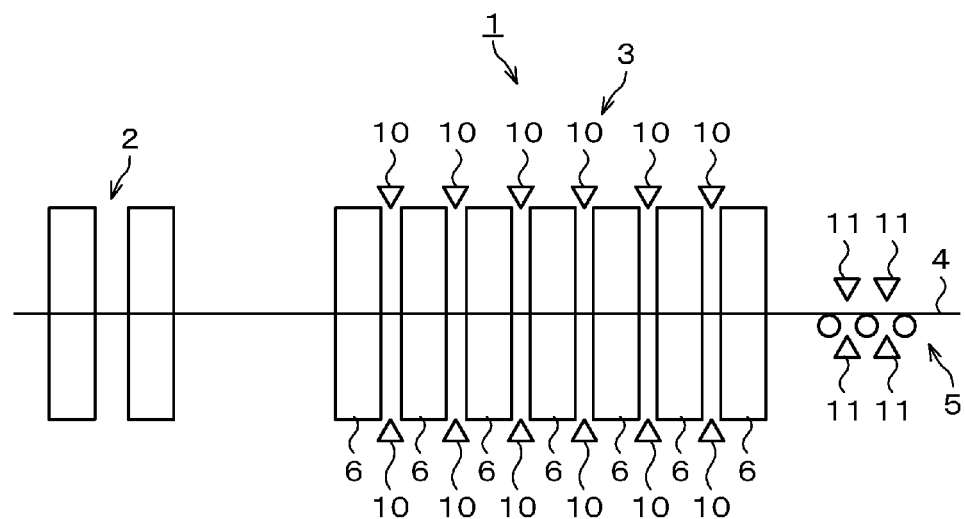
FIG. 6 is an explanatory view of a continuous hot rolling line.

Here, as shown in FIG. 6, on a continuous hot rolling line 1, the steel billet (slab) heated to a predetermined temperature in the heating furnace is rolled in a roughing mill 2 and in a finishing mill 3 sequentially to be a hot-rolled steel sheet 4 having a predetermined thickness, and the hot-rolled steel sheet 4 is carried out onto a run-out-table 5. In the manufacturing method of the present invention, in the rough rolling process (first hot rolling) performed in the roughing mill 2, the rolling at a reduction ratio of 40% or more is performed on the steel billet (slab) one time or more in the temperature range of not lower than 1000° C. nor higher than 1200° C.

The rough bar rolled to a predetermined thickness in the roughing mill 2 in this manner is next finish rolled (is subjected to the second hot rolling) through a plurality of rolling stands 6 of the finishing mill 3 to be the hot-rolled steel sheet 4. Then, in the finishing mill 3, the rolling at 30% or more is performed in one pass at least one time in the temperature region of not lower than the temperature T1+30° C. nor higher than T1+200° C. Further, in the finishing mill 3, the total reduction ratio becomes 50% or more.

Further, in the finish rolling process, after the final reduction at a reduction ratio of 30% or more is performed, the primary cooling is started in such a manner that the waiting time t second satisfies Expression (2) above or either Expression (2a) or (2b) above. The start of this primary cooling is performed by inter-stand cooling nozzles 10 disposed between the respective two of the rolling stands 6 of the finishing mill 3, or cooling nozzles 11 disposed in the run-out-table 5.

For example, when the final reduction at a reduction ratio of 30% or more is performed only at the rolling stand 6 disposed at the front stage of the finishing mill 3 (on the left side in FIG. 6, on the upstream side of the rolling) and the rolling whose reduction ratio becomes 30% or more is not performed at the rolling stand 6 disposed at the rear stage of the finishing mill 3 (on the right side in FIG. 6, on the downstream side of the rolling), if the start of the primary cooling is performed by the cooling nozzles 11 disposed in the run-out-table 5, a case that the waiting time t second does not satisfy Expression (2) above or Expressions (2a) and (2b) above is sometimes caused. In such a case, the primary cooling is started by the inter-stand cooling nozzles 10 disposed between the respective two of the rolling stands 6 of the finishing mill 3.

Further, for example, when the final reduction at a reduction ratio of 30% or more is performed at the rolling stand 6 disposed at the rear stage of the finishing mill 3 (on the right side in FIG. 6, on the downstream side of the rolling), even though the start of the primary cooling is performed by the cooling nozzles 11 disposed in the run-out-table 5, there is sometimes a case that the waiting time t second can satisfy Expression (2) above or Expressions (2a) and (2b) above. In such a case, the primary cooling may also be started by the cooling nozzles 11 disposed in the run-out-table 5. Needless to say, as long as the performance of the final reduction at a reduction ratio of 30% or more is completed, the primary cooling may also be started by the inter-stand cooling nozzles 10 disposed between the respective two of the rolling stands 6 of the finishing mill 3.

Then, in this primary cooling, the cooling that at an average cooling rate of 50° C./second or more, a temperature change (temperature drop) becomes not less than 40° C. nor more than 140° C. is performed.

When the temperature change is less than 40° C., the recrystallized austenite grains grow and low-temperature toughness deteriorates. The temperature change is set to 40° C. or more, thereby making it possible to suppress coarsening of the austenite grains. When the temperature change is less than 40° C., the effect cannot be obtained. On the other hand, when the temperature change exceeds 140° C., the recrystallization becomes insufficient to make it difficult to obtain a targeted random texture. Further, a ferrite phase effective for the elongation is also not obtained easily and the hardness of a ferrite phase becomes high, and thereby the elongation and the local deformability also deteriorate. Further, when the temperature change is greater than 140° C., an overshoot to/beyond an Ar3 transformation point temperature is likely to be caused. In the case, even by the transformation from recrystallized austenite, as a result of sharpening of variant selection, the texture is formed and the isotropy decreases consequently.

When the average cooling rate in the primary cooling is less than 50° C./second, as expected, the recrystallized austenite grains grow and the low-temperature toughness deteriorates. The upper limit of the average cooling rate is not determined in particular, but in terms of the steel sheet shape, 200° C./second or less is considered to be proper.

Further, in order to suppress the grain growth and obtain more excellent low-temperature toughness, a cooling device between passes or the like is desirably used to bring the heat generation by working between the respective stands of the finish rolling to 18° C. or lower.

The rolling ratio (reduction ratio) can be obtained by actual performances or calculation from the rolling load, sheet thickness measurement, or/and the like. The temperature of the steel billet during the rolling can be actually measured by a thermometer being disposed between the stands, or can be obtained by simulation by considering the heat generation by working from a line speed, the reduction ratio, or/and like, or can be obtained by the both methods.

Further, as has been explained previously, in order to promote the uniform recrystallization, the working amount in the temperature region of lower than T1+30° C. is desirably as small as possible and the reduction ratio in the temperature region of lower than T1+30° C. is desirably 30% or less. For example, in the event that in the finishing mill 3 on the continuous hot rolling line 1 shown in FIG. 6, in passing through one or two or more of the rolling stands 6 disposed on the front stage side (on the left side in FIG. 6, on the upstream side of the rolling), the steel sheet is in the temperature region of not lower than T1+30° C. nor higher than T1+200° C., and in passing through one or two or more of the rolling stands 6 disposed on the subsequent rear stage side (on the right side in FIG. 6, on the downstream side of the rolling), the steel sheet is in the temperature region of lower than T1+30° C., when the steel sheet passes through one or two or more of the rolling stands 6 disposed on the subsequent rear stage side (on the right side in FIG. 6, on the downstream side of the rolling), even though the reduction is not performed or is performed, the reduction ratio at lower than T1+30° C. is desirably 30% or less in total. In terms of the sheet thickness accuracy and the sheet shape, the reduction ratio at lower than T1+30° C. is desirably a reduction ratio of 10% or less in total. When the isotropy is further obtained, the reduction ratio in the temperature region of lower than T1+30° C. is desirably 0%.

In the manufacturing method of the present invention, a rolling speed is not limited in particular. However, when the rolling speed on the final stand side of the finish rolling is less than 400 mpm, γ grains grow to be coarse, regions in which ferrite can precipitate for obtaining the ductility are decreased, and thus the ductility is likely to deteriorate. Even though the upper limit of the rolling speed is not limited in particular, the effect of the present invention can be obtained, but it is actual that the rolling speed is 1800 mpm or less due to facility restriction. Therefore, in the finish rolling process, the rolling speed is desirably not less than 400 mpm nor more than 1800 mpm.

Incidentally, after this primary cooling, coiling is performed at an appropriate temperature and a hot-rolled original sheet can be obtained. In the present invention, the microstructure of the cold-rolled steel sheet is mainly formed by cold rolling later, or a heat treatment after cold rolling. Thus, a cooling pattern to the coiling does not have to be strictly controlled very much.

(Cold Rolling)

The hot-rolled original sheet manufactured as described above is pickled according to need to be subjected to cold rolling at a reduction ratio of not less than 30% nor more than 70%. When the reduction ratio is 30% or less, it becomes difficult to cause recrystallization in heating and holding later, resulting in that the equiaxed grain fraction decreases and further the crystal grains after heating become coarse. When rolling at over 70% is performed, a texture at the time of heating is developed, and thus the anisotropy becomes strong. Therefore, the reduction ratio is set to 70% or less.

(Heating and Holding)

The cold-rolled steel sheet is thereafter heated up to a temperature region of Ae3 to 950° C. and is held for 1 to 300 second/seconds in the temperature region of Ae3 to 950° C. in order to make an austenite single phase steel or a substantially austenite single phase steel. By this heating and holding, work hardening is removed. In order to heat the steel sheet after the cold rolling up to the temperature region of Ae3 to 950° C. in this manner, an average heating rate of not lower than room temperature nor higher than 650° C. is set to HR1 (° C./second) expressed by Expression (5) below, and an average heating rate of higher than 650° C. to Ae3 to 950° C. is set to HR2 (° C./second) expressed by Expression (6) below.

$$HR1 \geq 0.3 \qquad (5)$$

$$HR2 \leq 0.5 \times HR1 \qquad (6)$$

The hot rolling is performed under the above-described condition, and further the primary cooling is performed, and thereby making the crystal grains fine and randomization of the crystal orientations are achieved. However, by the cold rolling performed thereafter, the strong texture develops and the texture becomes likely to remain in the steel sheet. As a result, the r value and the elongation of the steel sheet decrease and the isotropy decreases. Thus, it is desired to make the texture that has developed by the cold rolling disappear as much as possible by appropriately performing the heating to be performed after the cold rolling. In order to achieve it, it is necessary to divide the average heating rate of the heating into two stages expressed by Expressions (5) and (6) above.

The detailed reason why the texture and properties of the steel sheet are improved by this two-stage heating is unclear, but this effect is thought to be related to recovery of dislocation introduced at the time of the cold rolling and the recrystallization. That is, driving force of the recrystallization to occur in the steel sheet by the heating is strain accumulated in the steel sheet by the cold rolling. When the average heating rate HR1 in the temperature range of not lower than room temperature nor higher than 650° C. is small, the dislocation introduced by the cold rolling recovers and the recrystallization does not occur. As a result, the texture that has developed at the time of the cold rolling remains as it is and the properties such as the isotropy deteriorate. When the average heating rate HR1 in the temperature range of not lower than room temperature nor higher than 650° C. is less than 0.3 ° C./second, the dislocation introduced by the cold rolling recovers, resulting in that the strong texture formed at the time of the cold rolling remains. Therefore, it is necessary to set the average heating rate HR1 in the temperature range of not lower than room temperature nor higher than 650° C. to 0.3 (° C./second) or more.

On the other hand, when the average heating rate HR2 of higher than 650° C. to Ae3 to 950° C. is large, ferrite existing in the steel sheet after the cold rolling does not recrystallize and non-recrystallized ferrite in a state of being worked remains. When the steel containing C of 0.01% or more in particular is heated to a two-phase region of ferrite and austenite, formed austenite blocks growth of recrystallized ferrite, and thus non-recrystallized ferrite becomes more likely to remain. This non-recrystallized ferrite has the strong texture, and thus the properties such as the r value and the isotropy are adversely affected, and this non-recrystallized ferrite contains a lot of dislocations, and thus the ductility is deteriorated drastically. Therefore, in the temperature range of higher than 650° C. to Ae3 to 950° C., the average heating rate HR2 needs to be 0.5×HR1 (° C./second) or less.

Further, at the two-stage average heating rate as above, the steel sheet is heated up to the temperature region of Ae3 to 950° C. and is held for 1 to 300 second/seconds in the temperature region of Ae3 to 950° C. If the temperature is lower than this range or the time is shorter than this range, the fraction of the bainite structure does not become 95% or more in a secondary cooling process thereafter, and the increased margin of the local ductility by the texture control decreases. On the other hand, if the steel sheet is continuously held at higher than 950° C. or longer than 300 seconds, the crystal grains become coarse, and thus an area ratio of the grains having 20 μm or less increases. Incidentally, Ae3 [° C.] is calculated by Expression (7) below by the contents of C, Mn, Si, Cu, Ni, Cr, and Mo [mass %]. Incidentally, when the selected element is not contained, the calculation is performed with the content of the selected element [mass %] set as zero.

$$Ae3=911-239C-36Mn+40Si-28Cu-20Ni-12Cr+63Mo \qquad (7)$$

Incidentally, in this heating and holding, the holding does not mean only the isothermal holding, and it is sufficient if the steel sheet is retained in the temperature range of Ae3 to 950° C. As long as the steel sheet is in the temperature range of Ae3 to 950° C., the temperature of the steel sheet may be changed.

(Secondary Cooling)

Thereafter, secondary cooling is performed down to a temperature of 500° C. or lower so that an average cooling rate in a temperature region of Ae4 to 500° C. may become not less than 10° C./s nor more than 200° C./s. When a secondary cooling rate is less than 10° C./s, ferrite is generated excessively, thereby making it impossible to bring the fraction of the bainite structure to 95% or more, and resulting in that the increased margin of the local ductility by the texture control decreases. On the other hand, even when the cooling rate is set to greater than 200° C./s, controllability at a cooling finishing temperature deteriorates significantly, and thus the cooling rate is set to 200° C./s or less. Preferably, an average cooling rate at HF (a heating and holding temperature) to 0.5 HF+250° C. is set not to exceed an average cooling rate at 0.5 HF+250° C. to 500° C. in order to securely suppress ferrite transformation and pearlite transformation.

(Overaging Heat Treatment)

In order to promote bainite transformation, an overaging heat treatment is performed in a temperature range of not lower than 350° C. nor higher than 500° C. subsequently to the secondary cooling. A holding time in this temperature range is set to t2 seconds or longer that satisfies Expression (4) below according to an overaging treatment temperature T2. However, in consideration of an applicable temperature range of Expression (4), the maximum value of t2 is set to 400 seconds.

$$\log(t2)=0.0002(T2-425)^2+1.18 \qquad (4)$$

Incidentally, in this overaging heat treatment, holding does not mean only the isothermal holding, and it is sufficient if the steel sheet is retained in the temperature range of not lower than 350° C. nor higher than 500° C. For example, the steel sheet may be once cooled to 350° C. to then be heated up to 500° C., or the steel sheet may also be cooled to 500° C. to then be cooled down to 350° C.

Incidentally, even when a surface treatment is performed on the high-strength cold-rolled steel sheet of the present invention, the effect of improving the local deformability does not disappear, and for example, a hot-dip galvanized layer, or an alloyed hot-dip galvanized layer may be formed on the surface of the steel sheet. In this case, the effect of the present invention can be obtained even when any one of electroplating, hot dipping, deposition plating, organic coating film forming, film laminating, organic salts/inorganic salts treatment, non-chromium treatment, and so on is performed. Further, the steel sheet according to the present invention can be applied not only to bulge forming but also to combined forming mainly composed of bending working such as bending, bulging, and drawing. Example Next, examples of the present invention will be explained. Incidentally, conditions of the examples are condition examples employed for confirming the applicability and effects of the present invention, and the present invention is not limited to these condition examples. The present invention can employ various conditions as long as the object of the present invention is achieved without departing from the spirit of the invention. Chemical compositions of respective steels used in examples are shown in Table 1. Respective manufacturing conditions are shown in Table 2 and Table 3. Further, structural constitutions and mechanical properties of respective steel types under the manufacturing conditions in Table 2 are shown in Table 4. Structural constitutions and mechanical properties of respective steel types under the manufacturing conditions in Table 3 are shown in Table 5. Incidentally, each underline in Tables indicates that a numeral value is outside the range of the present invention or is outside the range of a preferred range of the present invention.

As examples, there will be explained results of examinations using steels A to T satisfying the components of claims of the present invention and using comparative steels a to i, which have the chemical compositions shown in Table 1. Incidentally, in Table 1, each numerical value of the chemical compositions means mass %.

These steels were cast and then as they were, or were reheated after once being cooled down to room temperature and were heated to a temperature range of 1000° C. to 1300° C., and then were subjected to hot rolling under the conditions of Table 2 and Table 3, and the hot rolling was finished at an Ar3 transformation temperature or higher. Incidentally, in Table 2 and Table 3, English letters A to T and English letters a to i that are added to the steel types indicate to be the respective components of Steels A to T and a to i in Table 1.

In the hot rolling, first, in rough rolling being first hot rolling, rolling was performed one time or more at a reduction ratio of 40% or more in a temperature region of not lower than 1000° C. nor higher than 1200° C. However, with respect to Steel types B2, H3, and J2 in Table 2, and Steel types B2', H3', and J2' in Table 3, in the rough rolling, the rolling at a reduction ratio of 40% or more in one pass was not performed. The number of times of reduction and each reduction ratio (%) in the rough rolling, and an austenite grain diameter (μm) after the rough rolling (before finish rolling) are shown in Table 2 and Table 3.

After the rough rolling was finished, the finish rolling being second hot rolling was performed. In the finish rolling, rolling at a reduction ratio of 30% or more was performed in one pass at least one time in a temperature region of not lower than T1+30° C. nor higher than T1+200° C., and in a temperature range of lower than T1+30° C., the total reduction ratio was set to 30% or less. Incidentally, in the finish rolling, rolling at a reduction ratio of 30% or more was performed in a final pass in the temperature region of not lower than T1+30° C. nor higher than T1+200° C.

However, with respect to Steel types G2, H4, and M3 in Table 2 and Steel types G2', H4', and M3' in Table 3, the rolling at a reduction ratio of 30% or more was not performed in the temperature region of not lower than T1+30° C. nor higher than T1+200° C. Further, with regard to Steel types F3 and H6 in Table 2 and Steel types F3' and H6' in Table 3, the total reduction ratio in the temperature range of lower than T1+30° C. was greater than 30%.

Further, in the finish rolling, the total reduction ratio was set to 50% or more. However, with regard to Steel types G2, H4, and M3 in Table 2 and Steel types G2', H4', and M3' in Table 3, the total reduction ratio was less than 50%.

Table 2 and Table 3 show, in the finish rolling, the reduction ratio (%) in the final pass in the temperature region of not lower than T1+30° C. nor higher than T1+200° C. and the reduction ratio in a pass at one stage earlier than the final pass (reduction ratio in a pass before the final) (%). Further, Table 2 and Table 3 show, in the finish rolling, the total reduction ratio (%) in the temperature region of not lower than T1+30° C. nor higher than T1+200° C. and a temperature Tf after the reduction in the final pass in the temperature region of not lower than T1+30° C. nor higher than T1+200° C. Incidentally, the reduction ratio (%) in the final pass in the temperature region of not lower than T1+30° C. nor higher than T1+200° C. in the finish rolling is particularly important, to thus be shown in Table 2 and Table 3 as P1.

After the final reduction at a reduction ratio of 30% or more was performed in the finish rolling, primary cooling was started before a waiting time t second exceeding 2.5×t1. In the primary cooling, an average cooling rate was set to 50° C./second or more. Further, a temperature change (a cooled temperature amount) in the primary cooling was set to fall within a range of not less than 40° C. nor more than 140° C.

Under the manufacturing conditions shown in Table 2, after the final reduction at a reduction ratio of 30% or more was performed in the finish rolling, the primary cooling was started before the waiting time t second exceeding t1 (t<t1). On the other hand, under the manufacturing conditions shown in Table 3, after the final reduction at a reduction ratio of 30% or more was performed in the finish rolling, the primary cooling was started before the waiting time t second exceeding a range of t1 or longer to 2.5×t1 (t1≤t≤t1×2.5). Incidentally, ['] (dash) was added to each reference numeral of the steel types following the manufacturing conditions shown in Table 3 in order to distinguish the ranges of the waiting time t second.

However, with respect to Steel type H13' shown in Table 3, the primary cooling was started after the waiting time t second exceeded 2.5×t1 since the final reduction at a reduction ratio of 30% or more in the finish rolling. With regard to Steel type M2 in Table 2 and Steel type M2' in Table 3, the temperature change (cooled temperature amount) in the primary cooling was less than 40° C., and with regard to Steel type H12 in Table 2 and Steel type H12' in Table 3, the temperature change (cooled temperature amount) in the primary cooling was greater than 140° C. With regard to Steel type H8 in Table 2 and Steel type H8' in Table 3, the average cooling rate in the primary cooling was less than 50° C./second.

Table 2 and Table 3 show t1 (second) and 2.5×t1 (second) of the respective steel types. Further, Table 2 and Table 3 show the waiting time t (second) from completion of the final reduction at a reduction ratio of 30% or more to start of the primary cooling, t/t1, the average cooling rate (° C./second) in the primary cooling, and the temperature change (cooled temperature amount) (° C.).

After the primary cooling, coiling was performed and hot-rolled original sheets each having a thickness of 2 to 5 mm were obtained. Table 2 and Table 3 show the coiling temperature (° C.) of the respective steel types.

Next, the hot-rolled original sheets were each pickled to then be subjected to cold rolling at a reduction ratio of not less than 30% nor more than 70% to a thickness of 1.2 to 2.3 mm. However, with regard to Steel types E2 and L2 in Table 2 and Steel types E2' and L2' in Table 3, the reduction ratio of the cold rolling was less than 30%. Further, with regard to Steel type H11 in Table 2 and Steel type H11' in Table 3, the reduction ratio of the cold rolling was greater than 70%. Table 2 and Table 3 show the reduction ratio (%) in the cold rolling of the respective steel types.

After the cold rolling, heating was performed up to a temperature region of Ae3 to 950° C. and holding was performed for 1 to 300 second/seconds in the temperature region of Ae3 to 950° C. Further, in order to perform the heating up to the temperature region of Ae3 to 950° C., an average heating rate HR1(° C./second) of not lower than room temperature nor higher than 650° C. was set to 0.3 or more (HR1 ≥0.3), and an average heating rate HR2(° C./second) of higher than 650° C. to Ae3 to 950° C. was set to 0.5×HR1 or less (HR2≥0.5× HR1).

However, with regard to Steel types C2 and G3 in Table 2 and Steel types C2' and G3' in Table 3, a heating temperature was lower than Ae3. Further, with regard to Steel type H10 in Table 2 and Steel type H10' in Table 3, the heating temperature was higher than 950° C. With regard to Steel type N2 in Table 2 and Steel type N2' in Table 3, the holding time in the temperature region of Ae3 to 950° C. was longer than 300 seconds. Further, with regard to Steel type E2 in Table 2 and Steel type E2' in Table 3, the average heating rate HR1 was less than 0.3 (° C./second). With regard to Steel types C2, H6, and H8 in Table 2 and Steel types C2', H6', and H8' in Table 3, the average heating rate HR2 (° C./second) was greater than 0.5×HR1. Table 2 and Table 3 show As3 (° C.), the heating temperature (° C.), the holding time (second), and the average heating rates HR1 and HR2 (° C./second) of the respective steel types.

After the heating and holding, secondary cooling was performed at an average cooling rate of not less than 10° C./s nor more than 200° C./s in a temperature region of Ae3 to 500° C. However, with regard to Steel type H2 in Table 2 and Steel type H2' in Table 3, the average cooling rate in the secondary cooling was less than 10° C./s. Table 2 and Table 3 show the average cooling rate (° C./second) in the secondary cooling of the respective steel types.

After the secondary cooling, an overaging heat treatment was performed for not shorter than t2 seconds nor longer than 400 seconds in a temperature region of not lower than 350° C. nor higher than 500° C. However, with regard to Steel type H9 in Table 2 and Steel type H9' in Table 3, a heat treatment temperature of the overaging was lower than 350° C., and with regard to Steel types A2 and I2 in Table 2 and Steel types A2' and I2' in Table 3, the heat treatment temperature of the overaging was higher than 500° C. Further, with regard to Steel type D2 in Table 2 and Steel type D2' in Table 3, a treatment time of the overaging was shorter than t2 seconds, and with regard to Steel types A2, H9, and I2 in Table 2 and Steel types A2', H9', and I2' in Table 3, the treatment time of the overaging was longer than 400 seconds. Table 2 and Table 3 show the heat treatment temperature of the overaging, t2 (second), and the treatment time (second) of the respective steel types.

In all the cases of Table 2 and Table 3, after the overaging heat treatment, skin pass rolling at 0.5% was performed and material evaluation was performed.

Table 4 and Table 5 show an area ratio (structural fraction) (%) of bainite, pearlite, pro-eutectoid ferrite, martensite, and retained austenite in a metal structure of the respective steel types. Incidentally, Table 4 shows the structural constitutions and the mechanical properties of the steel types following the manufacturing conditions in Table 2. Further, Table 5 shows the structural constitutions and the mechanical properties of the steel types following the manufacturing conditions in Table 3. Incidentally, with regard to the structural fraction in Table 4 and Table 5, B means bainite, P means pearlite, F means pro-eutectoid ferrite, M means martensite, and rA means retained austenite. Table 4 and Table 5 show, of the respective steel types, an average value of pole densities of the {100}<011> to {223}<110> orientation group, a pole density of the {332}<113> crystal orientation, a mean volume diameter of crystal grains (size of a grain unit) (μm), and a ratio of crystal grains having dL/dt of 3.0 or less (equiaxed grain ratio) (%). Further, Table 4 and Table 5 show, of the respective steel types, tensile strength TS (MPa), an elongation percentage E1 (%), a hole expansion ratio λ (%) as an index of the local deformability, and a limit bend radius by 60° V-shape bending (a sheet thickness/a minimum bend radius). In a bending test, C-direction bending (C-bending) was performed. Incidentally, a tensile test and a bending test were based on JIS Z 2241 and Z 2248 (a V block 90° bending test). A hole expansion test was based on the Japan Iron and Steel Federation standard JFS T1001. The pole density of each of the crystal orientations was measured using the previously described EBSP at a 0.5 μm pitch on a ⅜ to ⅝ region at sheet thickness of a cross section parallel to the rolling direction.

Figure 7:
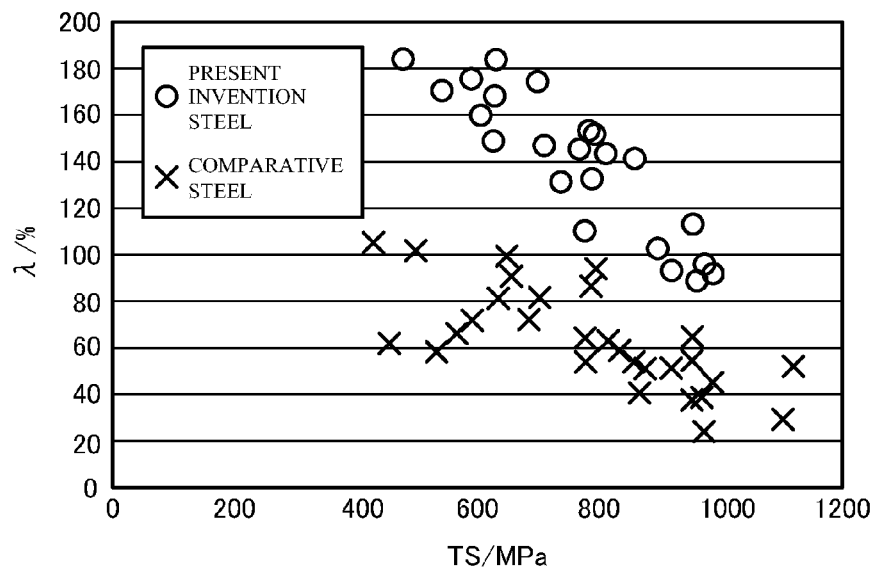
FIG. 7 shows the relationship between strength and hole expandability of present invention steels and comparative steels.
Figure 8:
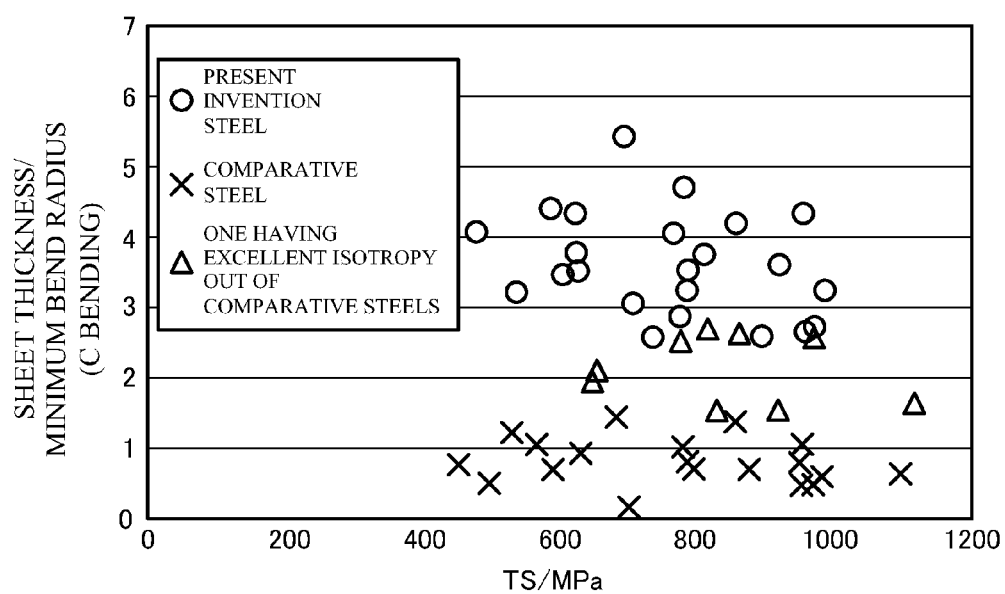
FIG. 8 shows the relationship between the strength and bendability of the present invention steels and the comparative steels.

As indexes of the hole expandability and the bendability, satisfying TS≥440 MPa, E1≥15%, λ≥90%, and the sheet thickness/the bend radius ≥2.5 were set as conditions. It is found that only ones satisfying the prescriptions of the present invention can have both the excellent hole expandability and bendability as shown in FIG. 7 and FIG. 8.

TABLE 1

|   | T1/° C. | Ae3 | C | Si | Mn | P | S | Al | N | O | Al + Si | Ti | Nb |
|---|---|---|---|---|---|---|---|---|---|---|---|---|---|
| A | 903 | 851 | 0.078 | 0.82 | 2.05 | 0.012 | 0.004 | 0.032 | 0.0026 | 0.0032 | 0.852 | 0.175 | 0.021 |
| B | 867 | 842 | 0.085 | 0.95 | 2.25 | 0.012 | 0.003 | 0.035 | 0.0032 | 0.0023 | 0.985 | 0 | 0 |
| C | 866 | 833 | 0.11 | 0.1 | 1.55 | 0.02 | 0.004 | 0.038 | 0.0033 | 0.0026 | 0.138 | 0 | 0.041 |
| D | 887 | 824 | 0.18 | 0.91 | 2.23 | 0.011 | 0.003 | 0.05 | 0.0028 | 0.0018 | 0.96 | 0.13 | 0 |
| E | 855 | 846 | 0.032 | 0.22 | 1.85 | 0.015 | 0.003 | 0.025 | 0.0055 | 0.0029 | 0.245 | 0 | 0.012 |
| F | 889 | 795 | 0.081 | 0.5 | 3.2 | 0.122 | 0.002 | 0.04 | 0.0032 | 0.0038 | 0.54 | 0.05 | 0.065 |
| G | 858 | 834 | 0.13 | 0.24 | 1.54 | 0.01 | 0.001 | 0.038 | 0.0025 | 0.0029 | 0.278 | 0 | 0.017 |
| H | 853 | 824 | 0.09 | 0.96 | 2.88 | 0.014 | 0.002 | 0.03 | 0.003 | 0.003 | 0.99 | 0 | 0 |
| I | 852 | 833 | 0.115 | 0.05 | 1.46 | 0.008 | 0.002 | 0.65 | 0.0034 | 0.0031 | 0.7 | 0 | 0 |
| J | 851 | 833 | 0.021 | 0.45 | 252 | 0.007 | 0.001 | 0.021 | 0.0024 | 0.0031 | 0.471 | 0 | 0 |

TABLE 1-continued

| | | | | | | | | | | | | | |
|---|---|---|---|---|---|---|---|---|---|---|---|---|---|
| K | 853 | 832 | 0.19 | 0.75 | 1.78 | 0.011 | 0.002 | 0.018 | 0.0032 | 0.0028 | 0.768 | 0 | 0 |
| L | 866 | 835 | 0.055 | 0.05 | 1.8 | 0.007 | 0.002 | 0.91 | 0.0033 | 0.0034 | 0.96 | 0 | 0 |
| M | 882 | 843 | 0.085 | 0.8 | 2.2 | 0.008 | 0.002 | 0.035 | 0.0022 | 0.0035 | 0.835 | 0.12 | 0 |
| N | 870 | 812 | 0.095 | 0.55 | 2.77 | 0.009 | 0.002 | 0.032 | 0.0033 | 0.0036 | 0.582 | 0.04 | 0 |
| O | 852 | 857 | 0.082 | 0.77 | 1.82 | 0.008 | 0.003 | 0.025 | 0.0032 | 0.0031 | 0.795 | 0 | 0 |
| P | 853 | 836 | 0.077 | 0.45 | 2.05 | 0.009 | 0.003 | 0.025 | 0.0029 | 0.0031 | 0.475 | 0 | 0 |
| Q | 861 | 817 | 0.142 | 0.7 | 2.44 | 0.008 | 0.002 | 0.03 | 0.0032 | 0.0035 | 0.73 | 0.03 | 0 |
| R | 852 | 839 | 0.07 | 0.61 | 2.2 | 0.015 | 0.002 | 0.028 | 0.0021 | 0.0036 | 0.638 | 0 | 0 |
| S | 867 | 816 | 0.09 | 0.61 | 2.2 | 0.011 | 0.002 | 0.028 | 0.0021 | 0.0036 | 0.638 | 0.06 | 0 |
| T | 851 | 843 | 0.08 | 0.18 | 1.56 | 0.006 | 0.002 | 0.8 | 0.0035 | 0.0045 | 0.98 | 0 | 0 |
| a | 859 | 853 | <u>0.015</u> | 0.9 | 2.4 | 0.005 | 0.001 | 0.033 | 0.0025 | 0.0014 | 0.933 | 0.01 | 0.01 |
| b | 856 | 792 | <u>0.25</u> | 0.6 | 2.3 | 0.009 | 0.002 | 0.035 | 0.0022 | 0.0015 | 0.635 | 0 | 0 |
| c | 854 | 768 | 0.08 | 0.95 | <u>4.5</u> | <u>0.2</u> | 0.002 | 0.034 | 0.0041 | 0.0015 | 0.984 | 0 | 0 |
| d | 914 | 834 | 0.08 | 0.35 | 2 | 0.008 | 0.002 | 0.033 | 0.0042 | 0.0034 | 0.383 | <u>0.25</u> | 0 |
| e | 939 | 822 | 0.07 | 0.35 | 2.4 | 0.008 | 0.002 | 0.035 | 0.0035 | 0.0026 | 0.385 | 0 | <u>0.25</u> |
| f | 851 | 857 | 0.09 | 0.1 | 1 | 0.008 | <u>0.04</u> | 0.036 | 0.0035 | 0.0022 | 0.136 | 0 | 0 |
| g | 963 | 804 | 0.15 | 0.2 | 2.2 | 0.008 | 0.002 | 0.033 | 0.0023 | 0.0036 | 0.233 | 0 | 0 |
| h | 853 | 814 | 0.14 | 0.11 | 1.9 | 0.008 | 0.002 | 0.032 | 0.0044 | 0.0035 | 0.142 | 0 | 0 |
| i | 853 | 833 | 0.12 | <u>1.05</u> | 2.55 | 0.009 | 0.002 | <u>1.05</u> | 0.0035 | 0.0025 | <u>2.1</u> | 0 | 0 |

| | B | Mg | Rem | Ca | Mo | Cr | W | As | Cu | Ni | Co | Sn | Zr | V |
|---|---|---|---|---|---|---|---|---|---|---|---|---|---|---|
| A | 0 | 0 | 0 | 0 | 0 | 0 | 0 | 0 | 0 | 0 | 0 | 0 | 0 | 0 |
| B | 0 | 0 | 0.0041 | 0 | 0 | 0 | 0 | 0 | 0.2 | 0 | 0 | 0 | 0 | 0.15 |
| C | 0 | 0 | 0 | 0 | 0 | 0 | 0 | 0 | 0 | 0 | 0 | 0 | 0 | 0 |
| D | 0.0018 | 0 | 0.0038 | 0 | 0 | 0 | 0 | 0 | 0 | 0 | 0 | 0 | 0 | 0 |
| E | 0 | 0 | 0 | 0 | 0 | 0 | 0 | 0 | 0 | 0 | 0 | 0 | 0 | 0 |
| F | 0 | 0 | 0.0044 | 0 | 0 | 0.1 | 0.07 | 0 | 0 | 0 | 0 | 0 | 0 | 0 |
| G | 0 | 0 | 0 | 0 | 0 | 0 | 0 | 0 | 0 | 0 | 0 | 0 | 0 | 0 |
| H | 0 | 0 | 0 | 0 | 0 | 0 | 0 | 0 | 0 | 0 | 0 | 0 | 0 | 0 |
| I | 0 | 0 | 0 | 0 | 0 | 0 | 0 | 0 | 0 | 0 | 0 | 0 | 0 | 0 |
| J | 0 | 0 | 0 | 0 | 0 | 0 | 0 | 0 | 0 | 0 | 0 | 0 | 0 | 0 |
| K | 0.0002 | 0 | 0 | 0 | 0 | 0 | 0 | 0 | 0 | 0 | 0 | 0 | 0 | 0 |
| L | 0 | 0 | 0 | 0.0022 | 0 | 0 | 0 | 0 | 0 | 0 | 0 | 0 | 0 | 0.15 |
| M | 0 | 0 | 0 | 0 | 0 | 0 | 0 | 0.01 | 0 | 0 | 0 | 0 | 0 | 0 |
| N | 0 | 0.006 | 0 | 0 | 0.022 | 0 | 0 | 0 | 0 | 0 | 0 | 0 | 0 | 0.05 |
| O | 0.0002 | 0 | 0 | 0 | 0 | 0 | 0 | 0 | 0 | 0 | 0 | 0 | 0 | 0 |
| P | 0 | 0 | 0 | 0 | 0 | 0.1 | 0.05 | 0 | 0 | 0 | 0 | 0 | 0 | 0 |
| Q | 0.0002 | 0 | 0 | 0 | 0 | 0 | 0 | 0 | 0 | 0 | 0 | 0 | 0 | 0 |
| R | 0 | 0.004 | 0.005 | 0 | 0 | 0 | 0 | 0 | 0 | 0 | 0 | 0 | 0 | 0 |
| S | 0 | 0 | 0 | 0 | 0 | 0 | 0 | 0 | 0.5 | 0.25 | 0 | 0 | 0.02 | 0 |
| T | 0 | 0 | 0 | 0 | 0 | 0 | 0 | 0 | 0 | 0 | 0.5 | 0.02 | 0 | 0 |
| a | 0 | 0.004 | 0.004 | 0 | 0 | 0.3 | 0 | 0 | 0 | 0 | 0 | 0 | 0 | 0 |
| b | 0 | 0 | 0 | 0 | 0 | 0 | 0 | 0 | 0 | 0 | 0 | 0 | 0 | 0 |
| c | 0 | 0 | 0 | 0 | 0 | 0 | 0 | 0 | 0 | 0 | 0 | 0 | 0 | 0 |
| d | 0 | 0 | 0 | 0 | 0 | 0 | 0 | 0 | 0 | 0 | 0 | 0 | 0 | 0 |
| e | 0 | 0 | 0 | 0 | 0 | 0 | 0 | 0 | 0 | 0 | 0 | 0 | 0 | 0 |
| f | 0 | 0 | 0 | 0 | 0 | 0 | 0 | 0 | 0 | 0 | 0 | 0 | 0 | 0 |
| g | 0 | <u>0.02</u> | 0 | 0 | 0 | 0 | 0 | 0 | 0 | 0 | 0 | 0 | 0 | <u>1.1</u> |
| h | 0 | 0 | <u>0.15</u> | 0 | 0 | 0 | 0 | 0 | 0 | 0 | 0 | 0 | 0 | 0 |
| i | 0 | 0 | 0 | 0 | 0 | 0 | 0 | 0 | 0 | 0 | 0 | 0 | 0 | 0 |

TABLE 2

| STEEL TYPE | T1/°C. | NUMBER OF TIMES OF REDUCTION AT 40% OF MORE AT NOT LOWER THAN 1000° C. NOR HIGHER THAN 1200° C. (ROUGH ROLLING) | REDUCTION RATIO AT 40% OF MORE AT NOT LOWER THAN 1000° C. NOR HIGHER THAN 1200° C. ROUGH ROLLING) | AUSTENDE GRAN DIAMETER BEFORE FINISH ROLLING/ μm | REDUCTION RATIO AT T1 + 30 TO T1 + 200° C. FINISH ROLLING)% | REDUCTION RATIO OF PASS BEFORE FINAL AT T1 + 30 TO T1 + 200° C. FINISH ROLLING)% | REDUCTION RATIO OF FINAL PASS AT T1 + 30 TO T1 + 200° C. FINISH ROLLING)% | REDUCTION RATIO AT T1 TO LOWER THAN T1 + 30° C. FINISH ROLLING)% | Tf: TEMPERATURE AFTER FINAL REDUCTION AT 30% OR MORE FINISH ROLLING)/ °C. | P1: REDUCTION RATIO OF FINAL REDUCTION AT 30% OR MORE FINISH ROLLING)% | t1/s | t1 × 2.5 |
|---|---|---|---|---|---|---|---|---|---|---|---|---|
| A1 | 903 | 2 | 45/45 | 80 | 89 | 40 | 40 | 10 | 1022 | 40 | 0.18 | 0.44 |
| A2 | 903 | 2 | 45/45 | 83 | 89 | 40 | 40 | 0 | 960 | 40 | 1.13 | 2.82 |
| B1 | 867 | 3 | 40/40/40 | 80 | 85 | 40 | 35 | 0 | 956 | 35 | 0.67 | 1.69 |
| B2 | 867 | 0 | — | 205 | 85 | 35 | 35 | 10 | 948 | 35 | 0.81 | 2.03 |
| C1 | 866 | 2 | 45/45 | 85 | 80 | 40 | 40 | 0 | 971 | 40 | 0.29 | 0.72 |
| C2 | 866 | 2 | 45/45 | 87 | 80 | 40 | 35 | 0 | 980 | 35 | 0.34 | 0.86 |
| D1 | 887 | 3 | 40/40/40 | 75 | 80 | 40 | 40 | 0 | 1001 | 40 | 0.21 | 0.52 |
| D2 | 887 | 3 | 40/40/40 | 77 | 80 | 40 | 40 | 0 | 966 | 40 | 0.65 | 1.62 |
| E1 | 855 | 2 | 45/45 | 83 | 75 | 35 | 35 | 0 | 930 | 40 | 0.73 | 1.82 |
| E2 | 855 | 2 | 45/45 | 88 | 89 | 35 | 35 | 0 | 948 | 36 | 0.61 | 1.52 |
| F1 | 889 | 2 | 45/45 | 85 | 85 | 40 | 40 | 0 | 981 | 40 | 0.44 | 1.11 |
| F2 | 889 | 1 | 40 | 130 | 75 | 35 | 35 | 0 | 952 | 35 | 1.18 | 2.95 |
| F3 | 889 | 2 | 45/45 | 80 | 85 | 40 | 40 | 0 | 943 | 40 | 1.21 | 3.03 |
| G1 | 858 | 2 | 45/45 | 85 | 85 | 40 | 40 | 0 | 902 | 40 | 1.49 | 3.73 |
| G2 | 858 | 2 | 45/45 | 86 | 45 | 25 | 25 | 0 | 931 | 25 | 1.44 | 3.61 |
| G3 | 853 | 2 | 45/45 | 83 | 85 | 40 | 40 | 40 | 907 | 40 | 1.35 | 3.37 |
| H1 | 853 | 2 | 45/45 | 85 | 89 | 40 | 40 | 0 | 982 | 40 | 0.14 | 0.34 |
| H2 | 853 | 2 | 45/45 | 90 | 89 | 40 | 40 | 0 | 975 | 40 | 0.16 | 0.40 |
| H3 | 853 | 0 | — | 225 | 35 | 25 | 25 | 0 | 980 | 40 | 0.37 | 0.93 |
| H4 | 853 | 2 | 45/45 | 87 | 65 | 40 | 40 | 0 | 950 | 25 | 1.04 | 2.60 |
| H5 | 853 | 2 | 45/45 | 85 | 89 | 40 | 40 | 0 | 964 | 40 | 0.23 | 0.57 |
| H6 | 853 | 2 | 45/45 | 86 | 89 | 40 | 40 | 40 | 962 | 40 | 0.25 | 0.61 |
| H7 | 853 | 1 | 50 | 140 | 89 | 40 | 40 | 0 | 991 | 40 | 0.13 | 0.33 |
| H8 | 853 | 2 | 45/45 | 85 | 89 | 40 | 40 | 0 | 972 | 40 | 0.18 | 0.44 |
| H9 | 853 | 2 | 45/45 | 89 | 89 | 40 | 40 | 0 | 980 | 40 | 0.14 | 0.36 |
| H10 | 853 | 2 | 45/45 | 89 | 89 | 40 | 40 | 0 | 980 | 40 | 0.14 | 0.35 |
| H11 | 853 | 2 | 45/45 | 89 | 89 | 40 | 40 | 0 | 980 | 40 | 0.14 | 0.35 |
| H12 | 853 | 2 | 45/45 | 89 | 89 | 40 | 40 | 0 | 980 | 40 | 0.14 | 0.35 |
| I1 | 852 | 2 | 45/45 | 78 | 89 | 40 | 40 | 0 | 965 | 40 | 0.21 | 0.54 |
| I2 | 852 | 3 | 40/40/40 | 80 | 85 | 40 | 40 | 0 | 948 | 40 | 0.39 | 0.96 |
| J1 | 852 | 3 | 40/40/40 | 80 | 80 | 40 | 40 | 0 | 901 | 40 | 1.31 | 3.27 |
| J2 | 851 | 2 | 45/45 | 85 | 87 | 40 | 40 | 0 | 943 | 40 | 0.44 | 1.09 |
| K1 | 851 | 0 | — | 205 | 75 | 30 | 30 | 0 | 924 | 30 | 1.24 | 3.10 |
| K2 | 853 | 1 | 40 | 150 | 75 | 30 | 30 | 0 | 925 | 30 | 1.22 | 3.05 |
| L1 | 866 | 1 | 40 | 150 | 85 | 35 | 35 | 0 | 1005 | 35 | 0.16 | 0.41 |
| L2 | 866 | 2 | 40/40 | 120 | 85 | 35 | 35 | 0 | 1007 | 35 | 0.29 | 0.73 |
| M1 | 882 | 2 | 40/40 | 123 | 85 | 45 | 40 | 0 | 1050 | 40 | 0.30 | 0.76 |
| M2 | 882 | 3 | 35/40/45 | 75 | 85 | 30 | 40 | 0 | 1051 | 40 | 0.26 | 0.64 |
| M3 | 882 | 3 | 35/40/45 | 76 | 85 | 45 | 40 | 0 | 1055 | 40 | 0.20 | 0.50 |
| N1 | 870 | 2 | 40/40 | 79 | 3.7 | 15 | 25 | 0 | 1027 | 25 | 0.15 | 0.37 |
| N2 | 870 | 2 | 40/40 | 82 | 85 | 40 | 40 | 0 | 1016 | 40 | 0.15 | 0.36 |
| O1 | 852 | 2 | 45/45 | 85 | 85 | 40 | 40 | 0 | 977 | 40 | 0.15 | 0.37 |

TABLE 2-continued

| STEEL TYPE | t: TIME FROM COMPLETION OF FINAL ROLLING AT 30% OR MORE TO PRIMARY COOLING/s | t/t1 | COOLING RATE IN PRIMARY COOLING/°C/s | TEMPERATURE DECREASE AMOUNT IN PRIMARY COOLING/°C | COOLING TEMPERATURE/°C | COLD ROLLING RATIO/% | HR1 | HR2 | $\lambda e3$/°C | HEATING TEMPERATURE/°C | HOLDING TIME/s | AVERAGE COOLING RATE FROM $\lambda e3$ TO 500°C/°C/s | OVERAGING HEAT TREATMENT TEMPERATURE/°C | t2/s | HOLDING TIME/s |
|---|---|---|---|---|---|---|---|---|---|---|---|---|---|---|---|
| P1 | | | | | | 40/40/40 | 83 | 85 | 35 | 35 | | 0 | 1033 | 35 | 0.20 | 0.51 |
| Q1 | | | | | | 40/40 | 92 | 80 | 40 | 40 | | 0 | 1001 | 40 | 0.13 | 0.33 |
| R1 | | | | | | 40/40/40 | 77 | 85 | 45 | 45 | | 10 | 995 | 45 | 0.23 | 0.58 |
| S1 | | | | | | 45/45 | 83 | 85 | 45 | 45 | | 0 | 1033 | 45 | 0.54 | 1.34 |
| T1 | | | | | | 45/45 | 88 | 85 | 45 | 45 | | 0 | 1009 | 45 | 0.40 | 1.00 |
| a1 | | | | | | 45/45 | 85 | 85 | 45 | 45 | | 0 | 988 | 45 | 0.14 | 0.35 |
| b1 | | | | | | 45/45 | 82 | 85 | 45 | 45 | | 0 | 980 | 45 | 0.13 | 0.33 |
| c1 | | | | | | 45/45 | 80 | 85 | 45 | 45 | | 0 | 981 | 45 | 0.14 | 0.34 |
| d1 | | | | | | 45/45 | 83 | 85 | 45 | 45 | | 0 | 1029 | 45 | 0.14 | 0.34 |
| e1 | | | | | | 45/45 | 85 | 85 | 45 | 45 | | 0 | 1048 | 45 | 0.16 | 0.40 |
| f1 | | | | | | 45/45 | 86 | 85 | 45 | 45 | | 0 | 977 | 45 | 0.13 | 0.34 |
| g1 | | | | | | 45/45 | 80 | 85 | 45 | 45 | | 0 | 1032 | 45 | 0.69 | 1.72 |
| h1 | | | | | | 45/45 | 85 | 85 | 45 | 45 | | 0 | 980 | 45 | 0.14 | 0.34 |
| i1 | | | | | | 45/45 | 88 | 85 | 45 | 45 | | 0 | 1013 | 45 | 0.43 | 1.08 |
| A1 | 0.12 | 0.68 | 55 | 60 | 550 | 60 | 2.10 | 0.90 | 846 | 890 | 90 | 16 | 480 | 61 | 250 |
| A2 | 0.88 | 0.78 | 55 | 50 | 550 | 60 | 1.70 | 0.70 | 846 | 890 | 90 | 15 | 550 | 400 | 450 |
| B1 | 0.60 | 0.89 | 100 | 40 | 450 | 45 | 1.40 | 0.65 | 845 | 900 | 150 | 13 | 400 | 20 | 400 |
| B2 | 0.60 | 0.74 | 100 | 50 | 450 | 45 | 1.60 | 0.60 | 845 | 900 | 150 | 13 | 400 | 20 | 400 |
| C1 | 0.20 | 0.70 | 100 | 70 | 400 | 70 | 1.60 | 0.60 | 815 | 870 | 30 | 13 | 400 | 20 | 400 |
| C2 | 0.30 | 0.87 | 100 | 50 | 450 | 70 | 1.40 | 1.00 | 815 | 720 | 30 | 28 | 400 | 20 | 400 |
| D1 | 0.12 | 0.58 | 60 | 90 | 700 | 45 | 1.80 | 0.70 | 818 | 900 | 60 | 100 | 350 | 202 | 350 |
| D2 | 0.20 | 0.31 | 60 | 60 | 700 | 45 | 2.20 | 0.90 | 818 | 900 | 30 | 17 | 350 | 202 | 350 |
| E1 | 0.60 | 0.82 | 80 | 50 | 500 | 50 | 1.60 | 0.65 | 843 | 870 | 60 | 16 | 400 | 20 | 400 |
| E2 | 0.52 | 0.85 | 80 | 40 | 520 | 18 | 0.20 | 0.07 | 843 | 870 | 40 | 13 | 380 | 38 | 200 |
| F1 | 0.30 | 0.68 | 120 | 90 | 480 | 60 | 1.70 | 0.70 | 805 | 850 | 40 | 13 | 380 | 38 | 200 |
| F2 | 0.96 | 0.81 | 120 | 100 | 550 | 60 | 1.20 | 0.60 | 805 | 850 | 40 | 17 | 450 | 20 | 200 |
| F3 | 1.05 | 0.87 | 120 | 60 | 500 | 60 | 1.30 | 0.60 | 805 | 850 | 60 | 17 | 450 | 20 | 200 |
| G1 | 1.20 | 0.80 | 110 | 50 | 450 | 60 | 1.80 | 0.85 | 816 | 870 | 60 | 22 | 450 | 20 | 200 |
| G2 | 0.70 | 0.48 | 110 | 40 | 500 | 60 | 2.10 | 1.00 | 816 | 870 | 60 | 16 | 450 | 20 | 300 |
| G3 | 1.30 | 0.96 | 110 | 50 | 500 | 60 | 2.00 | 0.90 | 816 | 850 | 60 | 9 | 450 | 20 | 300 |
| H1 | 0.12 | 0.87 | 70 | 100 | 500 | 50 | 0.40 | 0.10 | 829 | 850 | 60 | 16 | 450 | 20 | 300 |
| H2 | 0.14 | 0.84 | 70 | 80 | 500 | 50 | 2.20 | 1.00 | 829 | 850 | 60 | 16 | 450 | 20 | 300 |
| H3 | 0.35 | 0.95 | 70 | 100 | 500 | 50 | 2.40 | 1.00 | 829 | 850 | 60 | 16 | 450 | 20 | 300 |
| H4 | 0.82 | 0.79 | 70 | 90 | 500 | 50 | 2.30 | 1.00 | 829 | 850 | 60 | 16 | 450 | 20 | 300 |
| H5 | 0.21 | 0.92 | 70 | 120 | 500 | 50 | 3.00 | 1.40 | 829 | 850 | 60 | 16 | 450 | 20 | 300 |
| H6 | 0.20 | 0.81 | 70 | 100 | 500 | 50 | 2.60 | 1.40 | 829 | 850 | 60 | 16 | 450 | 20 | 300 |
| H7 | 0.11 | 0.84 | 70 | 70 | 500 | 50 | 1.60 | 0.70 | 829 | 850 | 60 | 16 | 450 | 20 | 300 |
| H8 | 0.15 | 0.85 | 40/70 | 90 | 500 | 50 | 2.70 | 4.30 | 829 | 850 | 60 | 16 | 300 | 400 | 300 |
| H9 | 0.12 | 0.86 | 70 | 70 | 500 | 85 | 1.30 | 0.45 | 829 | 850 | 60 | 19 | 450 | 20 | 300 |
| H10 | 0.12 | 0.86 | 70 | 70 | 500 | 50 | 1.30 | 0.45 | 829 | 960 | 60 | 19 | 450 | 20 | 300 |
| H11 | 0.12 | 0.86 | 70 | 70 | 500 | 50 | 1.10 | 0.45 | 829 | 850 | 60 | 19 | 450 | 20 | 300 |
| H12 | 0.12 | 0.93 | 60 | 160 | 390 | 70 | 1.10 | 0.50 | 872 | 900 | 90 | 14 | 500 | 202 | 300 |
| I1 | 0.20 | 0.65 | 60 | 40 | 450 | 70 | 2.50 | 1.20 | 872 | 900 | 90 | 11 | 600 | 400 | 450 |
| I2 | 0.25 | | | 100 | | | | | | | | | | | |

TABLE 2-continued

| | | | | | | | | | | | | | | | |
|---|---|---|---|---|---|---|---|---|---|---|---|---|---|---|---|
| J1 | 1.30 | 0.99 | 60 | 50 | 400 | 50 | 3.00 | 1.00 | 845 | 850 | 60 | 19 | 450 | 20 | 400 |
| J2 | 0.40 | 0.91 | 60 | 40 | 500 | 50 | 2.10 | 1.00 | 845 | 850 | 60 | 19 | 450 | 20 | 400 |
| K1 | 0.90 | 0.73 | 65 | 50 | 500 | 45 | 2.10 | 1.00 | 816 | 880 | 90 | 13 | 400 | 20 | 400 |
| K2 | 1.20 | 0.98 | 65 | 50 | 500 | 45 | 1.80 | 0.85 | 816 | 880 | 60 | 13 | 400 | 20 | 350 |
| L1 | 0.15 | 0.91 | 65 | 80 | 500 | 50 | 1.60 | 0.75 | 910 | 920 | 60 | 13 | 450 | 20 | 350 |
| L2 | 0.15 | 0.96 | 65 | 80 | 500 | 50 | 2.30 | 1.00 | 910 | 870 | 90 | 13 | 400 | 20 | 350 |
| M1 | 0.25 | 0.86 | 75 | 80 | 500 | <u>18</u> | 1.50 | 0.70 | 840 | 870 | 90 | 18 | 400 | 20 | 350 |
| M2 | 0.25 | 0.83 | 75 | 80 | 550 | 65 | 2.00 | 0.80 | 840 | 870 | 90 | 18 | 400 | 20 | 300 |
| M3 | 0.20 | 0.78 | 75 | 5 | 550 | 65 | 2.00 | 0.80 | 812 | 850 | 60 | 18 | 450 | 20 | 300 |
| N1 | 0.12 | 0.60 | 85 | 80 | 500 | 50 | 1.50 | 0.70 | 812 | 880 | <u>500</u> | 15 | 450 | 20 | 300 |
| N2 | 0.12 | 0.83 | 85 | 70 | 300 | 50 | 1.70 | 0.80 | 812 | 880 | 60 | 15 | 400 | 20 | 300 |
| O1 | 0.14 | 0.94 | 70 | 70 | 700 | 50 | 1.50 | 0.70 | 847 | 880 | 60 | 18 | 400 | 20 | 300 |
| P1 | 0.18 | 0.88 | 70 | 100 | 700 | 50 | 1.30 | 0.50 | 829 | 880 | 60 | 18 | 400 | 20 | 300 |
| Q1 | 0.12 | 0.91 | 70 | 80 | 700 | 50 | 1.90 | 0.60 | 812 | 880 | 60 | 18 | 400 | 20 | 300 |
| R1 | 0.17 | 0.74 | 70 | 100 | 700 | 50 | 1.80 | 0.80 | 836 | 910 | 60 | 18 | 400 | 20 | 300 |
| S1 | 0.40 | 0.74 | 70 | 70 | 700 | 50 | 2.00 | 0.80 | 825 | 880 | 60 | 18 | 400 | 20 | 300 |
| T1 | 0.20 | 0.50 | 70 | 130 | 700 | 50 | 2.30 | 1.00 | 901 | 880 | 60 | 18 | 400 | 20 | 300 |
| a1 | 0.10 | 0.71 | 80 | 110 | 500 | 50 | 2.10 | 0.84 | 874 | 880 | 60 | 18 | 400 | 20 | 300 |
| b1 | 0.10 | 0.76 | 80 | 60 | 500 | 50 | 1.60 | 0.59 | 786 | 880 | 60 | 18 | 400 | 20 | 300 |
| c1 | 0.10 | 0.73 | 80 | 60 | 500 | 50 | 1.10 | 0.34 | 795 | 880 | 60 | 18 | 400 | 20 | 300 |
| d1 | 0.10 | 0.73 | 80 | 60 | 500 | 50 | 1.50 | 0.54 | 825 | 880 | 60 | 18 | 400 | 20 | 300 |
| e1 | 0.10 | 0.62 | 80 | 60 | 500 | 50 | 1.20 | 0.39 | 820 | 880 | 60 | 18 | 400 | 20 | 300 |
| f1 | 0.10 | 0.74 | 80 | 60 | 500 | 50 | 1.20 | 0.39 | 834 | 880 | 60 | 18 | 400 | 20 | 300 |
| g1 | 0.50 | 0.73 | 80 | 60 | 500 | 50 | 1.20 | 0.39 | 793 | 880 | 60 | 18 | 400 | 20 | 300 |
| h1 | 0.10 | 0.73 | 80 | 60 | 500 | 50 | 1.30 | 0.44 | 798 | 880 | 60 | 18 | 400 | 20 | 300 |
| i1 | 0.31 | 0.71 | 80 | 60 | 500 | 50 | 1.50 | 0.54 | 928 | 930 | 60 | 18 | 400 | 20 | 300 |

TABLE 3

| STEEL TYPE | T1/°C. | NUMBER OF TIMES OF REDUCTION AT 40% OF MORE AT NOT LOWER THAN 1000° C. NOR HIGHER THAN 1200° C. (ROUGH ROLLING) | REDUCTION RATIO AT 40% OF MORE AT NOT LOWER THAN 1000° C. NOR HIGHER THAN 1200° C. (ROUGH ROLLING) | AUSTENDE GRAN DIAMETER BEFORE FINISH ROLLING/ μm | REDUCTION RATIO AT T1 + 30 TO T1 + 200° C. FINISH ROLLING/% | REDUCTION RATIO OF PASS BEFORE FINAL AT T1 + 30 TO T1 + 200° C. FINISH ROLLING/% | REDUCTION RATIO OF FINAL PASS AT T1 + 30 TO T1 + 200° C. FINISH ROLLING/% | REDUCTION RATIO AT T1 LOWER THAN TO T1 + 200° C. FINISH ROLLING/% | Tf: TEMPERATURE AFTER FINAL REDUCTION AT 30% OR MORE FINISH ROLLING/ °C. | P1: REDUCTION RATIO OF FINAL REDUCTION AT 30% OR MORE FINISH ROLLING/% | t1/s | t1 × 2.5 |
|---|---|---|---|---|---|---|---|---|---|---|---|---|
| A1' | 903 | 2 | 45/45 | 80 | 89 | 40 | 40 | 10 | 1022 | 40 | 0.18 | 0.44 |
| A2' | 903 | 2 | 45/45 | 83 | 89 | 40 | 40 | 0 | 960 | 40 | 1.13 | 2.82 |
| B1' | 867 | 3 | 40/40/40 | 80 | 85 | 35 | 35 | 0 | 956 | 35 | 0.67 | 1.69 |
| B2' | 867 | 0 | — | 205 | 85 | 35 | 35 | 10 | 948 | 35 | 0.81 | 2.03 |
| C1' | 866 | 2 | 45/45 | 85 | 80 | 40 | 40 | 0 | 971 | 40 | 0.29 | 0.72 |
| C2' | 866 | 2 | 45/45 | 87 | 80 | 35 | 35 | 0 | 980 | 35 | 0.34 | 0.86 |
| D1' | 887 | 3 | 40/40/40 | 75 | 80 | 40 | 40 | 0 | 1001 | 40 | 0.21 | 0.52 |
| D2' | 887 | 3 | 40/40/40 | 77 | 80 | 40 | 40 | 0 | 966 | 40 | 0.65 | 1.62 |
| E1' | 855 | 2 | 45/45 | 83 | 75 | 35 | 35 | 0 | 930 | 40 | 0.73 | 1.82 |
| E2' | 855 | 2 | 45/45 | 88 | 89 | 35 | 35 | 0 | 948 | 36 | 0.61 | 1.52 |
| F1' | 889 | 2 | 45/45 | 85 | 85 | 40 | 40 | 0 | 981 | 40 | 0.44 | 1.11 |
| F2' | 889 | 1 | 40 | 130 | 75 | 35 | 35 | 0 | 952 | 35 | 1.18 | 2.95 |
| F3' | 889 | 2 | 45/45 | 80 | 85 | 40 | 40 | 0 | 943 | 40 | 1.21 | 3.03 |
| G1' | 858 | 2 | 45/45 | 85 | 85 | 40 | 40 | 0 | 902 | 40 | 1.49 | 3.73 |
| G2' | 858 | 2 | 45/45 | 86 | 45 | 25 | 25 | 40 | 931 | 25 | 1.44 | 3.61 |
| G3' | 853 | 2 | 45/45 | 83 | 85 | 40 | 40 | 0 | 907 | 40 | 1.35 | 3.37 |
| H1' | 853 | 2 | 45/45 | 85 | 89 | 40 | 40 | 0 | 982 | 40 | 0.14 | 0.34 |
| H2' | 853 | 2 | 45/45 | 90 | 89 | 40 | 40 | 0 | 975 | 40 | 0.16 | 0.40 |
| H3' | 853 | 0 | — | 225 | 89 | 40 | 40 | 0 | 980 | 40 | 0.37 | 0.93 |
| H4' | 853 | 2 | 45/45 | 87 | 35 | 25 | 25 | 0 | 950 | 25 | 1.04 | 2.60 |
| H5' | 853 | 2 | 45/45 | 85 | 65 | 40 | 40 | 0 | 964 | 40 | 0.23 | 0.57 |
| H6' | 853 | 2 | 45/45 | 86 | 89 | 40 | 40 | 40 | 962 | 40 | 0.25 | 0.61 |
| H7' | 853 | 1 | 50 | 140 | 89 | 40 | 40 | 0 | 991 | 40 | 0.13 | 0.33 |
| H8' | 853 | 2 | 45/45 | 85 | 89 | 40 | 40 | 0 | 972 | 40 | 0.18 | 0.44 |
| H9' | 853 | 2 | 45/45 | 89 | 89 | 40 | 40 | 0 | 980 | 40 | 0.14 | 0.36 |
| H10' | 853 | 2 | 45/45 | 89 | 89 | 40 | 40 | 0 | 980 | 40 | 0.14 | 0.35 |
| H11' | 853 | 2 | 45/45 | 89 | 89 | 40 | 40 | 0 | 980 | 40 | 0.14 | 0.35 |
| H12' | 853 | 2 | 45/45 | 89 | 89 | 40 | 40 | 0 | 980 | 40 | 0.14 | 0.35 |
| H13' | 853 | 3 | 40/40/40 | 78 | 89 | 40 | 40 | 0 | 965 | 40 | 0.21 | 0.54 |
| I1' | 852 | 3 | 40/40/40 | 80 | 85 | 40 | 40 | 0 | 948 | 40 | 0.39 | 0.96 |
| J1' | 852 | 2 | 45/45 | 85 | 80 | 40 | 40 | 0 | 901 | 40 | 1.31 | 3.27 |
| J2' | 851 | 0 | — | 205 | 87 | 40 | 40 | 0 | 943 | 40 | 0.44 | 1.09 |
| K1' | 851 | 1 | 40 | 150 | 75 | 30 | 30 | 0 | 924 | 30 | 1.24 | 3.10 |
| K2' | 853 | 1 | 40 | 150 | 75 | 30 | 30 | 0 | 925 | 30 | 1.22 | 3.05 |
| L1' | 866 | 2 | 40/40 | 120 | 85 | 35 | 35 | 0 | 1005 | 35 | 0.16 | 0.41 |
| L2' | 882 | 2 | 40/40 | 123 | 85 | 35 | 35 | 0 | 1007 | 35 | 0.16 | 0.39 |
| M1' | 882 | 3 | 35/40/45 | 75 | 85 | 40 | 40 | 0 | 1050 | 40 | 0.29 | 0.73 |
| M2' | 882 | 3 | 35/40/45 | 76 | 85 | 45 | 45 | 0 | 1051 | 40 | 0.30 | 0.76 |
| M3' | 882 | 3 | 35/40/45 | 79 | 3.7 | 15 | 25 | 0 | 1055 | 25 | 0.26 | 0.64 |
| N1' | 870 | 2 | 40/40 | 82 | 85 | 40 | 40 | 0 | 1027 | 40 | 0.20 | 0.50 |
| N2' | 870 | 2 | 40/40 | 80 | 85 | 40 | 40 | 0 | 1016 | 40 | 0.15 | 0.36 |

TABLE 3-continued

| | t: TIME FROM COMPLETION OF FINAL ROLLING AT 30% OR MORE TO PRIMARY COOLING/s | t/t1 | COOLING RATE IN PRIMARY COOLING/°C./s | TEMPERATURE DECREASE AMOUNT IN PRIMARY COOLING/°C. | COOLING TEMPERATURE/°C. | COLD ROOLING RATIO/% | HR1 | HR2 | | | | | | | | | |
|---|---|---|---|---|---|---|---|---|---|---|---|---|---|---|---|---|---|
| O1' | | | 45/45 | | 852 | 85 | 40 | | | | | | | 977 | 40 | 0.15 | 0.37 |
| P1' | | | 40/40/40 | | 853 | 83 | 35 | | | | | | | 1033 | 35 | 0.20 | 0.51 |
| Q1' | | | 40/40 | | 861 | 92 | 40 | | | | | | | 1001 | 40 | 0.13 | 0.33 |
| R1' | | | 40/40/40 | | 852 | 77 | 45 | | | | | | | 995 | 45 | 0.23 | 0.58 |
| S1' | | | 45/45 | | 867 | 83 | 45 | | | | | | | 1033 | 45 | 0.54 | 1.34 |
| T1' | | | 45/45 | | 851 | 88 | 45 | | | | | | | 1009 | 45 | 0.40 | 1.00 |
| a1' | | | 45/45 | | 859 | 85 | 45 | | | | | | | 988 | 45 | 0.14 | 0.35 |
| b1' | | | 45/45 | | 856 | 82 | 45 | | | | | | | 980 | 45 | 0.13 | 0.33 |
| c1' | | | 45/45 | | 854 | 80 | 45 | | | | | | | 981 | 45 | 0.14 | 0.34 |
| d1' | | | 45/45 | | 914 | 83 | 45 | | | | | | | 1029 | 45 | 0.14 | 0.34 |
| e1' | | | 45/45 | | 939 | 85 | 45 | | | | | | | 1048 | 45 | 0.16 | 0.40 |
| f1' | | | 45/45 | | 851 | 86 | 45 | | | | | | | 977 | 45 | 0.13 | 0.34 |
| g1' | | | 45/45 | | 963 | 80 | 45 | | | | | | | 1032 | 45 | 0.69 | 1.72 |
| h1' | | | 45/45 | | 853 | 85 | 45 | | | | | | | 980 | 45 | 0.14 | 0.34 |
| i1' | | | 45/45 | | 853 | 88 | 45 | | | | | | | 1013 | 45 | 0.43 | 1.08 |

| STEEL TYPE | t: TIME FROM COMPLETION OF FINAL ROLLING AT 30% OR MORE TO PRIMARY COOLING/s | t/t1 | COOLING RATE IN PRIMARY COOLING/°C./s | TEMPERATURE DECREASE AMOUNT IN PRIMARY COOLING/°C. | COOLING TEMPERATURE/°C. | COLD ROOLING RATIO/% | HR1 | HR2 | Ae3/°C. | HEATING TEMPERATURE/°C. | HOLDING TIME/s | AVERAGE COOLING RATE FROM Ae3 TO 500°C/°C./s | OVERAGING HEAT TREATMENT TEMPERATURE/°C. | t2/s | HOLDING TIME/s |
|---|---|---|---|---|---|---|---|---|---|---|---|---|---|---|---|
| A1' | 0.40 | 2.27 | 55 | 60 | 550 | 60 | 2.10 | 0.90 | 846 | 890 | 90 | 16 | 480 | 61 | 250 |
| A2' | 2.00 | 1.77 | 55 | 50 | 550 | 60 | 1.70 | 0.70 | 846 | 890 | 90 | 15 | 550 | 400 | 450 |
| B1' | 1.00 | 1.48 | 100 | 40 | 450 | 45 | 1.40 | 0.65 | 845 | 900 | 150 | 13 | 400 | 20 | 400 |
| B2' | 1.00 | 1.23 | 100 | 50 | 450 | 45 | 1.40 | 0.60 | 845 | 900 | 150 | 13 | 400 | 20 | 400 |
| C1' | 0.50 | 1.74 | 100 | 70 | 400 | 70 | 1.60 | 0.60 | 815 | 870 | 30 | 28 | 400 | 20 | 400 |
| C2' | 0.50 | 1.45 | 100 | 50 | 450 | 70 | 1.40 | 1.00 | 815 | 720 | 30 | 100 | 400 | 202 | 400 |
| D1' | 0.50 | 2.42 | 60 | 90 | 700 | 45 | 1.80 | 0.70 | 818 | 900 | 30 | 17 | 350 | 202 | 350 |
| D2' | 1.00 | 1.54 | 60 | 60 | 700 | 45 | 2.20 | 0.90 | 818 | 870 | 60 | 17 | 350 | 20 | 150 |
| E1' | 1.00 | 1.37 | 80 | 60 | 500 | 50 | 1.60 | 0.65 | 843 | 850 | 60 | 16 | 400 | 20 | 350 |
| E2' | 1.00 | 1.64 | 80 | 40 | 520 | 18 | 0.20 | 0.07 | 843 | 870 | 40 | 16 | 400 | 20 | 350 |
| F1' | 1.00 | 2.26 | 120 | 90 | 480 | 60 | 1.70 | 0.70 | 805 | 850 | 60 | 13 | 380 | 38 | 200 |
| F2' | 2.00 | 1.69 | 120 | 100 | 550 | 60 | 1.20 | 0.60 | 805 | 850 | 40 | 13 | 380 | 38 | 200 |
| F3' | 2.00 | 1.65 | 120 | 60 | 500 | 60 | 1.30 | 0.60 | 805 | 850 | 60 | 13 | 380 | 38 | 200 |
| G1' | 2.00 | 1.34 | 110 | 50 | 450 | 60 | 1.80 | 0.85 | 816 | 870 | 60 | 17 | 450 | 20 | 200 |
| G2' | 3.00 | 2.08 | 110 | 40 | 500 | 60 | 2.10 | 1.00 | 816 | 870 | 60 | 17 | 450 | 20 | 200 |
| G3' | 3.00 | 2.23 | 110 | 50 | 500 | 60 | 2.00 | 0.90 | 816 | 750 | 60 | 22 | 450 | 20 | 200 |
| H1' | 0.30 | 2.18 | 70 | 100 | 500 | 50 | 0.40 | 0.10 | 829 | 850 | 60 | 16 | 450 | 20 | 300 |
| H2' | 0.40 | 2.49 | 70 | 80 | 500 | 50 | 2.20 | 1.00 | 829 | 850 | 60 | 9 | 450 | 20 | 300 |
| H3' | 0.80 | 2.16 | 70 | 100 | 500 | 50 | 2.40 | 1.00 | 829 | 850 | 60 | 16 | 450 | 20 | 300 |
| H4' | 2.00 | 1.92 | 70 | 90 | 500 | 50 | 2.30 | 1.00 | 829 | 850 | 60 | 16 | 450 | 20 | 300 |
| H5' | 0.50 | 2.18 | 70 | 120 | 500 | 50 | 3.00 | 1.40 | 829 | 850 | 60 | 16 | 450 | 20 | 300 |
| H6' | 0.50 | 2.03 | 70 | 100 | 500 | 50 | 2.60 | 1.40 | 829 | 850 | 60 | 16 | 450 | 20 | 300 |
| H7' | 0.30 | 2.30 | 70 | 70 | 500 | 50 | 1.60 | 0.70 | 829 | 850 | 60 | 16 | 450 | 20 | 300 |
| H8' | 0.40 | 2.28 | 40 | 90 | 500 | 50 | 2.70 | 4.30 | 829 | 850 | 60 | 19 | 450 | 400 | 450 |
| H9' | 0.30 | 2.11 | 70 | 70 | 500 | 85 | 1.30 | 0.45 | 829 | 850 | 60 | 19 | 300 | 20 | 300 |
| H10' | 0.30 | 2.14 | 70 | 70 | 500 | 50 | 1.30 | 0.45 | 829 | 960 | 60 | 19 | 450 | 20 | 300 |
| H11' | 0.30 | 2.14 | 70 | 160 | 500 | 50 | 1.30 | 0.45 | 829 | 850 | 60 | 19 | 450 | 20 | 300 |
| H12' | 0.30 | 2.14 | 70 | 70 | 500 | 50 | 1.30 | 0.45 | 829 | 850 | 60 | 19 | 450 | 20 | 300 |
| H13' | 0.50 | 3.57 | 70 | 70 | 500 | 50 | 1.30 | 0.45 | 829 | 850 | 60 | 19 | 450 | 20 | 300 |

TABLE 3-continued

| | | | | | | | | | | | | | | | |
|---|---|---|---|---|---|---|---|---|---|---|---|---|---|---|---|
| I1' | 0.50 | 2.33 | 60 | 40 | 390 | 70 | 1.10 | 0.50 | 872 | 900 | 90 | 14 | 500 | 202 | 300 |
| I2' | 0.50 | 1.30 | 60 | 100 | 450 | 70 | 2.50 | 1.20 | 872 | 900 | 90 | 11 | <u>600</u> | 400 | 450 |
| J1' | 3.00 | 2.29 | 60 | 50 | 400 | 50 | 3.00 | 1.00 | 845 | 850 | 60 | 19 | 450 | 20 | 400 |
| J2' | 1.00 | 2.29 | 60 | 40 | 500 | 50 | 2.10 | 1.00 | 845 | 850 | 60 | 19 | 400 | 20 | 400 |
| K1' | 3.00 | 2.42 | 65 | 50 | 500 | 45 | 2.10 | 1.00 | 816 | 880 | 90 | 13 | 400 | 20 | 400 |
| K2' | 3.00 | 2.46 | 65 | 50 | 500 | 50 | 1.80 | 0.85 | 816 | 880 | 90 | 13 | 450 | 20 | 350 |
| L1' | 0.40 | 2.44 | 65 | 80 | 500 | 45 | 1.60 | 0.75 | 910 | 920 | 90 | 13 | 450 | 20 | 350 |
| L2' | 0.30 | 1.92 | 65 | 80 | 500 | 80 | 2.30 | 1.00 | 910 | 920 | 90 | 13 | 400 | 20 | 350 |
| M1' | 0.70 | 2.40 | 75 | 80 | 500 | <u>18</u> | 1.50 | 0.70 | 840 | 870 | 90 | 18 | 450 | 20 | 300 |
| M2' | 0.70 | 2.32 | 75 | 80 | 500 | 65 | 2.00 | 0.80 | 840 | 870 | 90 | 18 | 400 | 20 | 300 |
| M3' | 0.60 | 2.35 | 75 | <u>5</u> | 550 | 65 | 2.00 | 0.80 | 840 | 870 | 90 | 18 | 400 | 20 | 300 |
| N1' | 0.45 | 2.26 | 85 | 70 | 550 | 50 | 1.50 | 0.70 | 812 | 850 | 60 | 15 | 450 | 20 | 300 |
| N2' | 0.30 | 2.07 | 85 | 70 | 300 | 50 | 1.70 | 0.80 | 812 | 850 | <u>500</u> | 15 | 400 | 20 | 300 |
| O1' | 0.30 | 2.02 | 70 | 100 | 700 | 50 | 1.50 | 0.70 | 847 | 880 | 60 | 18 | 400 | 20 | 300 |
| P1' | 0.50 | 2.45 | 70 | 80 | 700 | 50 | 1.30 | 0.50 | 829 | 880 | 60 | 18 | 400 | 20 | 300 |
| Q1' | 0.30 | 2.27 | 70 | 100 | 700 | 50 | 1.90 | 0.60 | 812 | 880 | 60 | 18 | 400 | 20 | 300 |
| R1' | 0.50 | 2.17 | 70 | 70 | 700 | 50 | 1.80 | 0.80 | 836 | 880 | 60 | 18 | 400 | 20 | 300 |
| S1' | 1.00 | 1.86 | 70 | 130 | 700 | 50 | 2.00 | 0.80 | 825 | 910 | 60 | 18 | 400 | 20 | 300 |
| T1' | 1.00 | 2.49 | 70 | 110 | 700 | 50 | 2.30 | 1.00 | 901 | 880 | 60 | 18 | 400 | 20 | 300 |
| a1' | 0.30 | 2.13 | 80 | 60 | 500 | 50 | 2.10 | 0.84 | 874 | 880 | 60 | 18 | 400 | 20 | 300 |
| b1' | 0.30 | 2.28 | 80 | 60 | 500 | 50 | 1.60 | 0.59 | 786 | 880 | 60 | 18 | 400 | 20 | 300 |
| c1' | 0.30 | 2.19 | 80 | 60 | 500 | 50 | 1.10 | 0.34 | 795 | 880 | 60 | 18 | 400 | 20 | 300 |
| d1' | 0.30 | 2.18 | 80 | 60 | 500 | 50 | 1.50 | 0.54 | 825 | 880 | 60 | 18 | 400 | 20 | 300 |
| e1' | 0.40 | 2.49 | 80 | 60 | 500 | 50 | 1.50 | 0.39 | 820 | 880 | 60 | 18 | 400 | 20 | 300 |
| f1' | 0.30 | 2.23 | 80 | 60 | 500 | 50 | 1.20 | 0.39 | 834 | 880 | 60 | 18 | 400 | 20 | 300 |
| g1' | 1.00 | 1.46 | 80 | 60 | 500 | 50 | 1.20 | 0.39 | 793 | 880 | 60 | 18 | 400 | 20 | 300 |
| h1' | 0.30 | 2.18 | 80 | 60 | 500 | 50 | 1.30 | 0.44 | 798 | 880 | 60 | 18 | 400 | 20 | 300 |
| i1' | 1.00 | 2.31 | 80 | 60 | 500 | 50 | 1.50 | 0.54 | 928 | 930 | 60 | 18 | 400 | 20 | 300 |

TABLE 4

| STEEL TYPE | STRUCTURAL FRACTION | AVERAGE VALUE OF POLE DENSITIES OF {100}<011> TO {223}<110> ORIENTATION GROUP | POLE DENSITY OF {332}<113> | SIZE OF GRAIN UNIT/ μm | EQUIAXED GRAIN RATIO % | TS/MPa | El/% | λ/% | SHEET THICKNESS/ MINIMUM BEND | |
|---|---|---|---|---|---|---|---|---|---|---|
| A1 | B + 1% P + 3% F | 2.6 | 3.0 | 2.3 | 59 | 791 | 22 | 151 | 3.5 | PRESENT INVENTION STEEL |
| A2 | B + 5% P + 5% F | 2.0 | 2.3 | 2.7 | 67 | 829 | 21 | 58 | 1.6 | COMPARATIVE STEEL |
| B1 | B + 1% F | 2.1 | 1.9 | 5.4 | 68 | 696 | 21 | 173 | 5.4 | PRESENT INVENTION STEEL |
| B2 | B | 4.2 | 5.5 | 4.2 | 34 | 702 | 21 | 80 | 0.2 | COMPARATIVE STEEL |
| C1 | B + 1% M | 2.6 | 3.5 | 1.9 | 64 | 737 | 24 | 130 | 2.6 | PRESENT INVENTION STEEL |
| C2 | F + 30% B | 5.5 | 6.7 | 5.2 | 47 | 454 | 32 | 62 | 0.7 | COMPARATIVE STEEL |
| D1 | B + 4% rA | 2.6 | 3.5 | 3.9 | 65 | 985 | 16 | 91 | 3.2 | PRESENT INVENTION STEEL |
| D2 | B + 8% M | 2.9 | 3.8 | 1.7 | 62 | 1119 | 15 | 51 | 1.6 | COMPARATIVE STEEL |
| E1 | B + 1% M | 2.7 | 3.3 | 5.1 | 64 | 539 | 28 | 169 | 3.2 | PRESENT INVENTION STEEL |
| E2 | B + 1% M | 4.2 | 5.1 | 8.5 | 37 | 532 | 20 | 58 | 1.2 | COMPARATIVE STEEL |
| F1 | B + 3% F | 2.4 | 3.2 | 2.2 | 64 | 961 | 18 | 90 | 2.6 | PRESENT INVENTION STEEL |
| F2 | B + 1% F + 1% M | 3.1 | 4.2 | 4.0 | 54 | 973 | 15 | 95 | 2.7 | PRESENT INVENTION STEEL |
| F3 | B + 5% F | 4.2 | 5.7 | 3.3 | 35 | 952 | 15 | 64 | 0.5 | COMPARATIVE STEEL |
| G1 | B + 3% F | 2.2 | 2.8 | 2.8 | 66 | 858 | 20 | 140 | 4.2 | PRESENT INVENTION STEEL |
| G2 | B | 4.6 | 5.6 | 4.8 | 54 | 875 | 16 | 51 | 0.7 | COMPARATIVE STEEL |
| G3 | B + 35% F | 4.5 | 5.1 | 5.5 | 45 | 634 | 22 | 81 | 0.9 | COMPARATIVE STEEL |
| H1 | B + 4% F | 2.0 | 2.5 | 4.2 | 67 | 782 | 20 | 152 | 4.7 | PRESENT INVENTION STEEL |
| H2 | B + 30% F + 2% P | 2.0 | 2.6 | 4.1 | 66 | 656 | 24 | 90 | 2.1 | COMPARATIVE STEEL |
| H3 | B + 3% F | 4.2 | 5.1 | 4.7 | 40 | 786 | 18 | 87 | 0.8 | COMPARATIVE STEEL |
| H4 | B + 3% F | 4.8 | 5.9 | 8.8 | 55 | 778 | 13 | 64 | 1.0 | COMPARATIVE STEEL |
| H5 | B + 4% F | 3.2 | 3.9 | 6.8 | 62 | 777 | 16 | 109 | 2.8 | PRESENT INVENTION STEEL |
| H6 | B + 2% F | 4.1 | 5.4 | 3.6 | 34 | 793 | 19 | 94 | 0.7 | COMPARATIVE STEEL |
| H7 | B + 3% F | 2.4 | 3.4 | 4.0 | 55 | 787 | 19 | 132 | 3.2 | PRESENT INVENTION STEEL |
| H8 | B + 3% F | 1.3 | 1.7 | 9.1 | 74 | 777 | 9 | 54 | 2.5 | COMPARATIVE STEEL |
| H9 | B + 1% F + 10% P | 2.1 | 2.6 | 3.9 | 66 | 917 | 17 | 51 | 1.6 | COMPARATIVE STEEL |
| H10 | B + 2% F | 3.1 | 3.8 | 10.0 | 70 | 796 | 19 | 103 | 2.9 | COMPARATIVE STEEL |
| H11 | B + 4% F | 4.6 | 5.6 | 7.0 | 52 | 784 | 20 | 55 | 0.7 | COMPARATIVE STEEL |
| H12 | B + 4% F | 4.2 | 5.1 | 4.2 | 65 | 792 | 19 | 80 | 0.9 | COMPARATIVE STEEL |
| I1 | B | 2.0 | 2.2 | 3.3 | 69 | 626 | 27 | 148 | 3.8 | PRESENT INVENTION STEEL |
| I2 | F + 33% B + 12% P | 2.3 | 2.6 | 1.1 | 66 | 649 | 29 | 98 | 2.0 | COMPARATIVE STEEL |

TABLE 4-continued

| STEEL TYPE | STRUCTURAL FRACTION | AVERAGE VALUE OF POLE DENSITIES OF {100}<011> TO {223}<110> ORIENTATION GROUP | POLE DENSITY OF {332}<113> | SIZE OF GRAIN UNIT/ μm | EQUIAXED GRAIN RATIO % | TS/MPa | El/% | λ/% | SHEET THICKNESS/ MINIMUM BEND | |
|---|---|---|---|---|---|---|---|---|---|---|
| J1 | B + 5% F | 2.2 | 2.8 | 6.1 | 67 | 480 | 29 | 183 | 4.1 | PRESENT INVENTION STEEL |
| J2 | B + 2% F + 2% P | 4.1 | 5.9 | 7.3 | 47 | 500 | 25 | 101 | 0.5 | COMPARATIVE STEEL |
| K1 | B + 1% M | 3.2 | 4.1 | 4.9 | 50 | 895 | 15 | 102 | 2.6 | PRESENT INVENTION STEEL |
| K2 | B + 2% F | 2.5 | 3.3 | 10.0 | 58 | 865 | 9 | 41 | 2.6 | COMPARATIVE STEEL |
| L1 | B | 2.3 | 3.2 | 5.2 | 60 | 606 | 24 | 159 | 3.5 | PRESENT INVENTION STEEL |
| L2 | B + 2% F | 4.1 | 5.1 | 8.8 | 25 | 591 | 19 | 71 | 0.7 | COMPARATIVE STEEL |
| M1 | B | 2.1 | 2.3 | 3.5 | 68 | 956 | 17 | 112 | 4.3 | PRESENT INVENTION STEEL |
| M2 | B + 3% F | 2.1 | 2.4 | 9.5 | 68 | 968 | 10 | 39 | 2.6 | COMPARATIVE STEEL |
| M3 | B | 4.7 | 5.5 | 8.0 | 57 | 971 | 11 | 23 | 0.5 | COMPARATIVE STEEL |
| N1 | B + 3% F | 2.4 | 3.0 | 2.9 | 64 | 811 | 21 | 143 | 3.7 | PRESENT INVENTION STEEL |
| N2 | B | 2.2 | 0.6 | 9.2 | 67 | 817 | 13 | 63 | 2.7 | COMPARATIVE STEEL |
| O1 | B | 2.1 | 2.6 | 5.3 | 67 | 589 | 25 | 175 | 4.4 | PRESENT INVENTION STEEL |
| P1 | B + 2% F | 2.1 | 2.7 | 5.2 | 67 | 624 | 24 | 167 | 4.3 | PRESENT INVENTION STEEL |
| Q1 | B + 3% F | 2.4 | 3.1 | 5.7 | 65 | 920 | 15 | 92 | 3.6 | PRESENT INVENTION STEEL |
| R1 | B | 2.7 | 3.4 | 3.9 | 59 | 708 | 22 | 146 | 3.0 | PRESENT INVENTION STEEL |
| S1 | B | 2.3 | 2.8 | 4.1 | 66 | 767 | 20 | 144 | 4.0 | PRESENT INVENTION STEEL |
| T1 | B | 2.5 | 3.2 | 2.2 | 62 | 629 | 28 | 183 | 3.5 | PRESENT INVENTION STEEL |
| a1 | B + 26% F | 2.3 | 2.9 | 3.6 | 65 | 427 | 39 | 105 | 1.7 | COMPARATIVE STEEL |
| b1 | B + 5% P | 2.2 | 2.8 | 4.0 | 66 | 855 | 18 | 53 | 1.4 | COMPARATIVE STEEL |
| c1 | B | 2.3 | 2.8 | 3.7 | 66 | 952 | 16 | 38 | 1.0 | COMPARATIVE STEEL |
| d1 | B | 4.9 | 6.6 | 4.0 | 66 | 985 | 16 | 44 | 0.6 | COMPARATIVE STEEL |
| e1 | B | 4.3 | 5.8 | 3.3 | 64 | 951 | 17 | 54 | 0.8 | COMPARATIVE STEEL |
| f1 | B + 2% F | 2.3 | 2.9 | 3.8 | 65 | 568 | 29 | 66 | 1.1 | COMPARATIVE STEEL |
| g1 | B | 5.1 | 6.2 | 4.0 | 66 | 1099 | 14 | 29 | 0.6 | COMPARATIVE STEEL |
| h1 | B | 2.3 | 2.9 | 3.7 | 65 | 683 | 24 | 71 | 1.4 | COMPARATIVE STEEL |
| i1 | B + 10% M + 5% rA | 2.3 | 2.9 | 3.8 | 65 | 864 | 18 | 56 | 1.4 | COMPARATIVE STEEL |

TABLE 5

| STEEL TYPE | STRUCTURAL FRACTION | AVERAGE VALUE OF POLE DENSITIES OF {100}<011> TO {223}<110> ORIENTATION GROUP | POLE DENSITY OF {332}<113> | SIZE OF GRAIN UNIT/μm | EQUIAXED GRAIN RATIO % | TS/MPa | El/% | λ/% | SHEET THICKNESS/ MINIMUM BEND | |
|---|---|---|---|---|---|---|---|---|---|---|
| A1' | B + 1% P + 3% F | 2.5 | 3.0 | 2.5 | 59 | 716 | 23 | 158 | 3.5 | PRESENT INVENTION STEEL |
| A2' | B + 5% P + 5% F | 2.0 | 2.2 | 2.9 | 67 | 747 | 22 | 61 | 1.6 | COMPARATIVE STEEL |
| B1' | B + 1% F | 2.0 | 1.9 | 5.6 | 68 | 640 | 22 | 181 | 5.4 | PRESENT INVENTION STEEL |
| B2' | B | 4.2 | 5.5 | 4.4 | 34 | 645 | 21 | 84 | 0.2 | COMPARATIVE STEEL |
| C1' | B + 1% M | 2.5 | 3.5 | 2.1 | 64 | 673 | 25 | 136 | 2.6 | PRESENT INVENTION STEEL |
| C2' | F + 30% B | 5.5 | 6.7 | 5.4 | 47 | 444 | 33 | 63 | 0.7 | COMPARATIVE STEEL |
| D1' | B + 4% rA | 2.5 | 3.4 | 4.1 | 65 | 874 | 17 | 97 | 3.2 | PRESENT INVENTION STEEL |
| D2' | B + 8% M | 2.8 | 3.8 | 1.9 | 62 | 983 | 16 | 55 | 1.6 | COMPARATIVE STEEL |
| E1' | B + 1% M | 2.6 | 3.3 | 5.3 | 64 | 512 | 28 | 173 | 3.2 | PRESENT INVENTION STEEL |
| E2' | B + 1% M | 4.2 | 5.1 | 8.7 | 37 | 507 | 21 | 59 | 1.2 | COMPARATIVE STEEL |
| F1' | B + 3% F | 2.3 | 3.1 | 2.4 | 64 | 854 | 19 | 93 | 2.6 | PRESENT INVENTION STEEL |
| F2' | B + 1% F + 1% M | 3.0 | 4.2 | 4.2 | 54 | 864 | 16 | 100 | 2.7 | PRESENT INVENTION STEEL |
| F3' | B + 5% F | 4.1 | 5.7 | 3.5 | 35 | 847 | 16 | 67 | 0.5 | COMPARATIVE STEEL |
| G1' | B + 3% F | 2.2 | 2.7 | 3.0 | 66 | 771 | 21 | 148 | 4.2 | PRESENT INVENTION STEEL |
| G2' | B | 4.5 | 5.5 | 5.0 | 54 | 785 | 17 | 53 | 0.7 | COMPARATIVE STEEL |
| G3' | B + 35% F | 4.5 | 5.1 | 5.7 | 45 | 589 | 22 | 84 | 0.9 | COMPARATIVE STEEL |
| H1' | B + 4% F | 1.9 | 2.4 | 4.4 | 67 | 709 | 21 | 159 | 4.7 | PRESENT INVENTION STEEL |
| H2' | B + 30% F + 2% P | 2.0 | 2.5 | 4.3 | 66 | 607 | 25 | 94 | 2.1 | COMPARATIVE STEEL |
| H3' | B + 3% F | 4.2 | 5.1 | 4.9 | 40 | 713 | 19 | 91 | 0.8 | COMPARATIVE STEEL |
| H4' | B + 3% F | 4.7 | 5.8 | 9.0 | 55 | 706 | 14 | 67 | 1.0 | COMPARATIVE STEEL |
| H5' | B + 4% F | 3.1 | 3.9 | 7.0 | 62 | 705 | 17 | 114 | 2.8 | PRESENT INVENTION STEEL |
| H6' | B + 2% F | 4.0 | 5.4 | 3.8 | 34 | 718 | 19 | 98 | 0.7 | COMPARATIVE STEEL |
| H7' | B + 3% F | 2.3 | 3.4 | 4.2 | 55 | 714 | 20 | 138 | 3.2 | PRESENT INVENTION STEEL |
| H8' | B + 3% F | 1.2 | 1.7 | 9.3 | 74 | 706 | 9 | 56 | 2.5 | COMPARATIVE STEEL |
| H9' | B + 1% F + 10% P | 2.0 | 2.5 | 4.1 | 66 | 818 | 18 | 54 | 1.6 | COMPARATIVE STEEL |
| H10' | B + 2% F | 3.1 | 3.8 | 10.2 | 70 | 721 | 20 | 108 | 2.9 | COMPARATIVE STEEL |
| H11' | B + 4% F | 4.6 | 5.6 | 7.2 | 52 | 711 | 21 | 58 | 0.7 | COMPARATIVE STEEL |
| H12' | B + 4% F | 4.2 | 5.1 | 4.4 | 65 | 718 | 20 | 84 | 0.9 | COMPARATIVE STEEL |
| H13' | B + 2% F | 1.2 | 1.4 | 10.2 | 70 | 708 | 21 | 88 | 2.5 | COMPARATIVE STEEL |
| I1' | B | 2.0 | 2.2 | 3.5 | 69 | 583 | 28 | 153 | 3.8 | PRESENT INVENTION STEEL |

TABLE 5-continued

| STEEL TYPE | STRUCTURAL FRACTION | AVERAGE VALUE OF POLE DENSITIES OF {100}<011> TO {223}<110> ORIENTATION GROUP | POLE DENSITY OF {332}<113> | SIZE OF GRAIN UNIT/μm | EQUIAXED GRAIN RATIO % | TS/MPa | El/% | λ/% | SHEET THICKNESS/ MINIMUM BEND | |
|---|---|---|---|---|---|---|---|---|---|---|
| I2' | F + 33% B + 12% P | 2.3 | 2.5 | 1.3 | 66 | 602 | 30 | 101 | 2.0 | COMPARATIVE STEEL |
| J1' | B + 5% F | 2.2 | 2.7 | 6.3 | 67 | 465 | 30 | 186 | 4.1 | PRESENT INVENTION STEEL |
| J2' | B + 2% F + 2% P | 4.1 | 5.9 | 7.5 | 47 | 481 | 25 | 103 | 0.5 | COMPARATIVE STEEL |
| K1' | B + 1% M | 3.2 | 4.0 | 5.1 | 50 | 801 | 16 | 107 | 2.6 | PRESENT INVENTION STEEL |
| K2' | B + 2% F | 2.4 | 3.2 | 10.2 | 58 | 776 | 9 | 44 | 2.6 | COMPARATIVE STEEL |
| L1' | B | 2.3 | 3.1 | 5.4 | 60 | 567 | 25 | 164 | 3.5 | PRESENT INVENTION STEEL |
| L2' | B + 2% F | 4.1 | 5.1 | 9.0 | 25 | 554 | 20 | 73 | 0.7 | COMPARATIVE STEEL |
| M1' | B | 2.1 | 2.3 | 3.7 | 68 | 850 | 18 | 119 | 4.3 | PRESENT INVENTION STEEL |
| M2' | B + 3% F | 2.1 | 2.3 | 9.7 | 68 | 860 | 11 | 41 | 2.6 | COMPARATIVE STEEL |
| M3' | B | 4.7 | 5.5 | 8.2 | 57 | 862 | 12 | 25 | 0.5 | COMPARATIVE STEEL |
| N1' | B + 3% F | 2.4 | 2.9 | 3.1 | 64 | 733 | 22 | 150 | 3.7 | PRESENT INVENTION STEEL |
| N2' | B | 2.2 | 0.6 | 9.4 | 67 | 738 | 13 | 66 | 2.7 | COMPARATIVE STEEL |
| O1' | B | 2.0 | 2.6 | 5.5 | 67 | 553 | 26 | 181 | 4.4 | PRESENT INVENTION STEEL |
| P1' | B + 2% F | 2.1 | 2.6 | 5.4 | 67 | 581 | 25 | 173 | 4.3 | PRESENT INVENTION STEEL |
| Q1' | B + 3% F | 2.4 | 3.0 | 5.9 | 65 | 821 | 16 | 98 | 3.6 | PRESENT INVENTION STEEL |
| R1' | B | 2.7 | 3.4 | 4.1 | 59 | 649 | 23 | 152 | 3.0 | PRESENT INVENTION STEEL |
| S1' | B | 2.2 | 2.8 | 4.3 | 66 | 698 | 21 | 151 | 4.0 | PRESENT INVENTION STEEL |
| T1' | B | 2.5 | 3.1 | 2.4 | 62 | 586 | 29 | 189 | 3.5 | PRESENT INVENTION STEEL |
| a1' | B + 26% F | 2.3 | 2.8 | 3.8 | 65 | 422 | 39 | 88 | 1.7 | COMPARATIVE STEEL |
| b1' | B + 5% P | 2.2 | 2.7 | 4.2 | 66 | 768 | 19 | 56 | 1.4 | COMPARATIVE STEEL |
| c1' | B | 2.2 | 2.7 | 3.9 | 66 | 847 | 17 | 40 | 1.0 | COMPARATIVE STEEL |
| d1' | B | 4.9 | 6.6 | 4.2 | 66 | 874 | 17 | 46 | 0.6 | COMPARATIVE STEEL |
| e1' | B | 4.3 | 5.8 | 3.5 | 64 | 846 | 18 | 57 | 0.8 | COMPARATIVE STEEL |
| f1' | B + 2% F | 2.2 | 2.8 | 4.0 | 65 | 536 | 29 | 68 | 1.1 | COMPARATIVE STEEL |
| g1' | B | 5.1 | 6.2 | 4.2 | 66 | 967 | 15 | 31 | 0.6 | COMPARATIVE STEEL |
| h1' | B | 2.2 | 2.8 | 3.9 | 65 | 629 | 25 | 74 | 1.4 | COMPARATIVE STEEL |
| i1' | B + 10% M + 5% rA | 2.3 | 2.9 | 4.0 | 65 | 776 | 19 | 59 | 1.4 | COMPARATIVE STEEL |

EXPLANATION OF CODES 1 continuous hot rolling line
2 roughing mill
3 finishing mill
4 hot-rolled steel sheet
5 run-out-table
6 rolling stand 10 inter-stand cooling nozzle
11 cooling nozzle 11
The invention claimed is:

1. A manufacturing method of a high-strength cold-rolled steel sheet having excellent local deformability, comprising:
on a steel billet containing:
in mass %,
C: not less than 0.02% nor more than 0.20%;
Si: not less than 0.001% nor more than 2.5%;
Mn: not less than 0.01% nor more than 4.0%;
P: not less than 0.001% nor more than 0.15%;
S: not less than 0.0005% nor more than 0.03%;
Al: not less than 0.001% nor more than 2.0%;
N: not less than 0.0005% nor more than 0.01%; and
O: not less than 0.0005% nor more than 0.01%; in which Si+Al is limited to less than 1.0%, and
a balance being composed of iron and inevitable impurities,
performing first hot rolling in which rolling at a reduction ratio of 40% or more is performed one time or more in a temperature range of not lower than 1000° C. nor higher than 1200° C.;
setting an austenite grain diameter to 200 µm or less by the first hot rolling;
performing second hot rolling in which rolling at a reduction ratio of 30% or more is performed in one pass at least one time in a temperature region of not lower than a temperature T1+30° C. nor higher than T1+200° C. determined by Expression (1) below;
setting the total reduction ratio in the second hot rolling to 50% or more;
performing final reduction at a reduction ratio of 30% or more in the second hot rolling and then starting primary cooling in such a manner that a waiting time t second satisfies Expression (2) below;
setting an average cooling rate in the primary cooling to 50° C./second or more and performing the primary cooling in a manner that a temperature change is in a range of not lower than 40° C. nor higher than 140° C.;
performing cold rolling at a reduction ratio of not less than 30% nor more than 70%;
performing heating and holding for 1 to 300 second/seconds in a temperature region of Ae3 to 950° C.;
performing secondary cooling at an average cooling rate of not less than 10° C./s nor more than 200° C./s in a temperature region of Ae3 to 500° C.; and
performing an overaging heat treatment in which holding is performed for not shorter than t2 seconds satisfying Expression (4) below nor longer than 400 seconds in a temperature region of not lower than 350° C. nor higher than 500° C.

$$T1(° C.)=850+10\times(C+N)\times Mn+350\times Nb+250\times Ti+40\times B+10\times Cr+100\times Mo+100\times V \quad (1)$$

$$t\leq 2.5\times t1 \quad (2)$$

Here, t1 is obtained by Expression (3) below $$t1=0.001\times((Tf-T1)\times P1/100)^2-0.109\times((Tf-T1)\times P1/100)+3.1 \quad (3)$$

Here, in Expression (3) above, Tf represents the temperature of the steel billet obtained after the final reduction at a reduction ratio of 30% or more, and P1 represents the reduction ratio of the final reduction at 30% or more $$\log(t2)=0.0002(T2-425)^2+1.18 \quad (4)$$

Here, T2 represents an overaging treatment temperature, and the maximum value of t2 is set to 400.

2. The manufacturing method of the high-strength cold-rolled steel sheet having excellent local deformability according to claim 1, wherein the total reduction ratio in a temperature range of lower than T1+30° C. is 30% or less.

3. The manufacturing method of the high-strength cold-rolled steel sheet having excellent local deformability according to claim 1, wherein the waiting time t second further satisfies Expression (2a) below $$t<t1 \quad (2a).$$

4. The manufacturing method of the high-strength cold-rolled steel sheet having excellent local deformability according to claim 1, wherein the waiting time t second further satisfies Expression (2b) below $$t1\leq t\leq t1\times 2.5 \quad (2b).$$

5. The manufacturing method of the high-strength cold-rolled steel sheet having excellent local deformability according to claim 1, wherein the primary cooling is started between rolling stands.

6. The manufacturing method of the high-strength cold-rolled steel sheet having excellent local deformability according to claim 1, wherein when heating is performed up to the temperature region of Ae3 to 950° C. after the cold rolling, an average heating rate of not lower than room temperature nor higher than 650° C. is set to HR1 (° C./second) expressed by Expression (5) below, and
an average heating rate of higher than 650° C. to the temperature region of Ae3 to 950° C. is set to HR2 (° C./second) expressed by Expression (6) below $$HR1\geq 0.3 \quad (5)$$

$$HR2\leq 0.5\times HR1 \quad (6).$$

7. The manufacturing method of the high-strength cold-rolled steel sheet having excellent local deformability according to claim 1, further comprising:
forming a hot-dip galvanized layer or an alloyed hot-dip galvanized layer on the surface.

* * * * *